(12) United States Patent
Tajima et al.

(10) Patent No.: US 8,948,597 B2
(45) Date of Patent: Feb. 3, 2015

(54) NETWORK DESIGN APPARATUS

(71) Applicant: Fujitsu Limited, Kawasaki-shi (JP)

(72) Inventors: Kazuyuki Tajima, Yokosuka (JP);
Tomohiro Hashiguchi, Inagi (JP);
Yutaka Takita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 124 days.

(21) Appl. No.: 13/725,070

(22) Filed: Dec. 21, 2012

(65) Prior Publication Data
US 2013/0216230 A1 Aug. 22, 2013

(30) Foreign Application Priority Data

Feb. 20, 2012 (JP) ................. 2012-034093

(51) Int. Cl.
*H04B 17/00* (2006.01)
*H04J 4/00* (2006.01)
*H04J 14/08* (2006.01)
*H04J 14/02* (2006.01)

(52) U.S. Cl.
CPC ............. *H04J 14/08* (2013.01); *H04J 14/0257* (2013.01); *H04J 14/0267* (2013.01)
USPC .................... 398/75; 398/25; 398/34; 398/35

(58) Field of Classification Search
CPC ............. H04Q 2011/0062; H04Q 2011/0069; H04Q 2011/0075; H04Q 2011/0079; H04Q 2011/0081; H04Q 2011/0086; H04Q 2011/009; H04J 14/0227; H04J 14/0228; H04J 14/0238; H04J 14/0278; H04J 2014/0227; H04J 2203/0055; H04J 2203/0058
USPC .................................. 398/25, 34, 35, 58, 75
See application file for complete search history.

(56) References Cited

U.S. PATENT DOCUMENTS

| 7,599,620 | B2 * | 10/2009 | Graves et al. | 398/51 |
| 8,687,959 | B2 * | 4/2014 | Muppidi et al. | 398/30 |
| 2002/0143927 | A1 * | 10/2002 | Maltz et al. | 709/224 |
| 2008/0298805 | A1 * | 12/2008 | Lee et al. | 398/48 |

FOREIGN PATENT DOCUMENTS

JP 2005-86675 A 3/2005

* cited by examiner

*Primary Examiner* — Dalzid Singh
(74) *Attorney, Agent, or Firm* — Fujitsu Patent Center

(57) ABSTRACT

Based on the demand information etc., an accommodation designing problem and an assignment problem are solved in a conventional method to design a network. It is confirmed whether or not a restriction on the number of wavelengths for each link is observed. When there are links exceeding the restriction of the number of wavelengths, the number of available wavelengths is subtracted from the first link having the largest number of excess wavelengths and the second link farthest from the first link in the links, and the result is set as a wavelength number limited value, thereby performing a network designing process again.

15 Claims, 43 Drawing Sheets

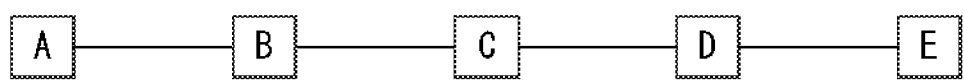
F I G. 1

| START POINT STATION | END POINT STATION | BANDWIDTH | NUMBER |
|---|---|---|---|
| A | B | 6 | 5 |
| B | C | 4 | 4 |
| C | D | 2 | 8 |
| D | E | 6 | 5 |
| A | E | 4 | 8 |

FIG. 2

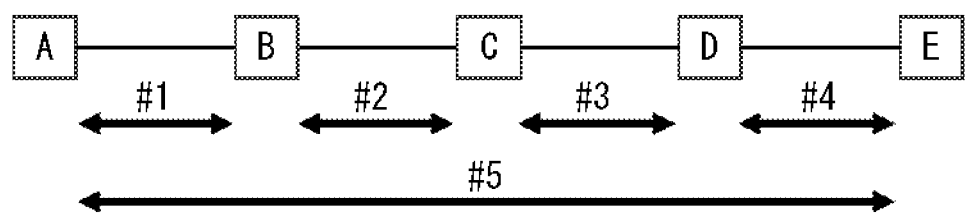
F I G. 3

| START POINT STATION | END POINT STATION | NUMBER |
|---|---|---|
| A | B | 8 |
| B | C | 6 |
| C | D | 6 |
| D | E | 8 |

F I G. 4

| START POINT STATION | END POINT STATION | NUMBER |
|---|---|---|
| A | B | 9 |
| B | C | 6 |
| C | D | 6 |
| D | E | 9 |

F I G. 5

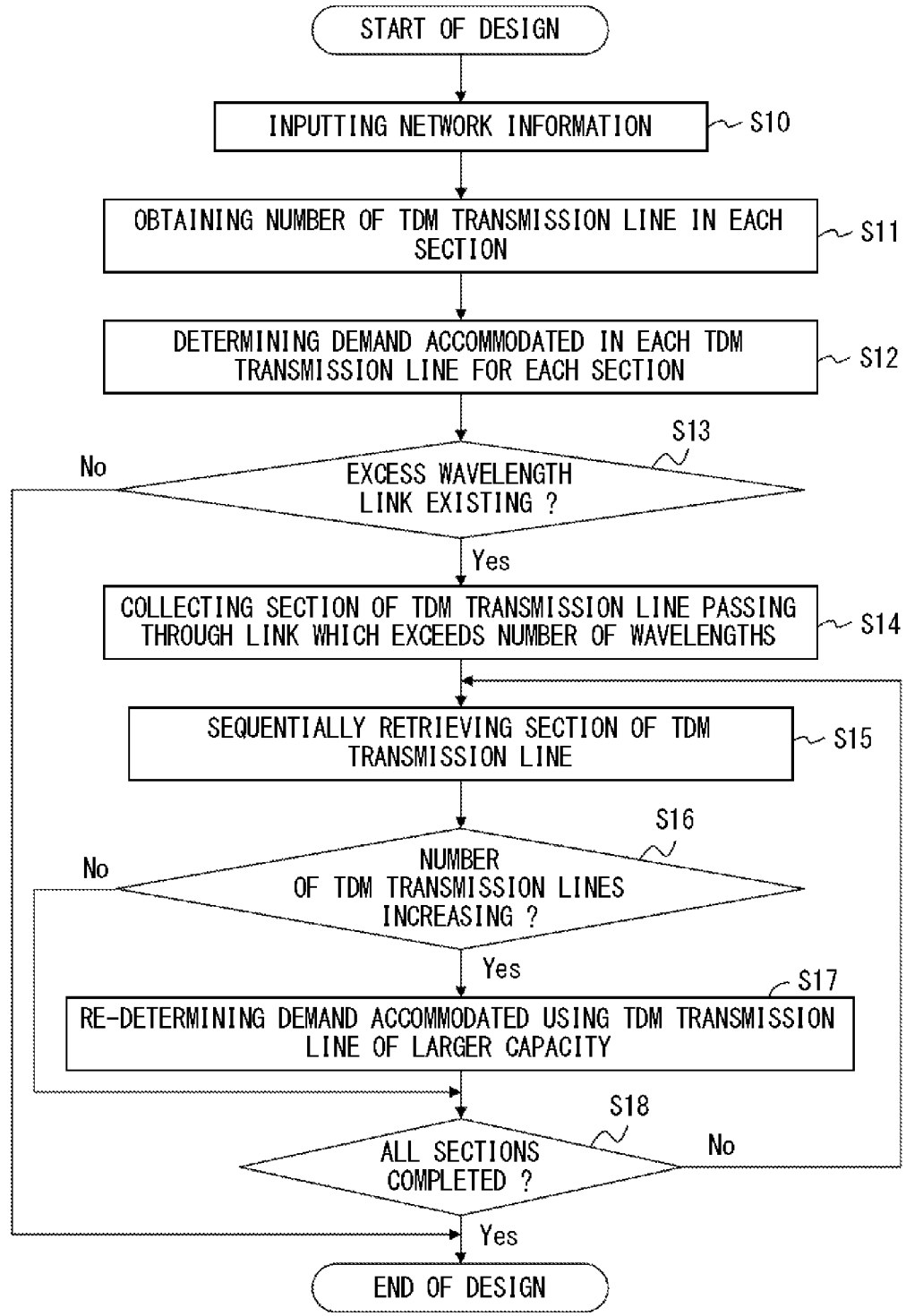
F I G. 6

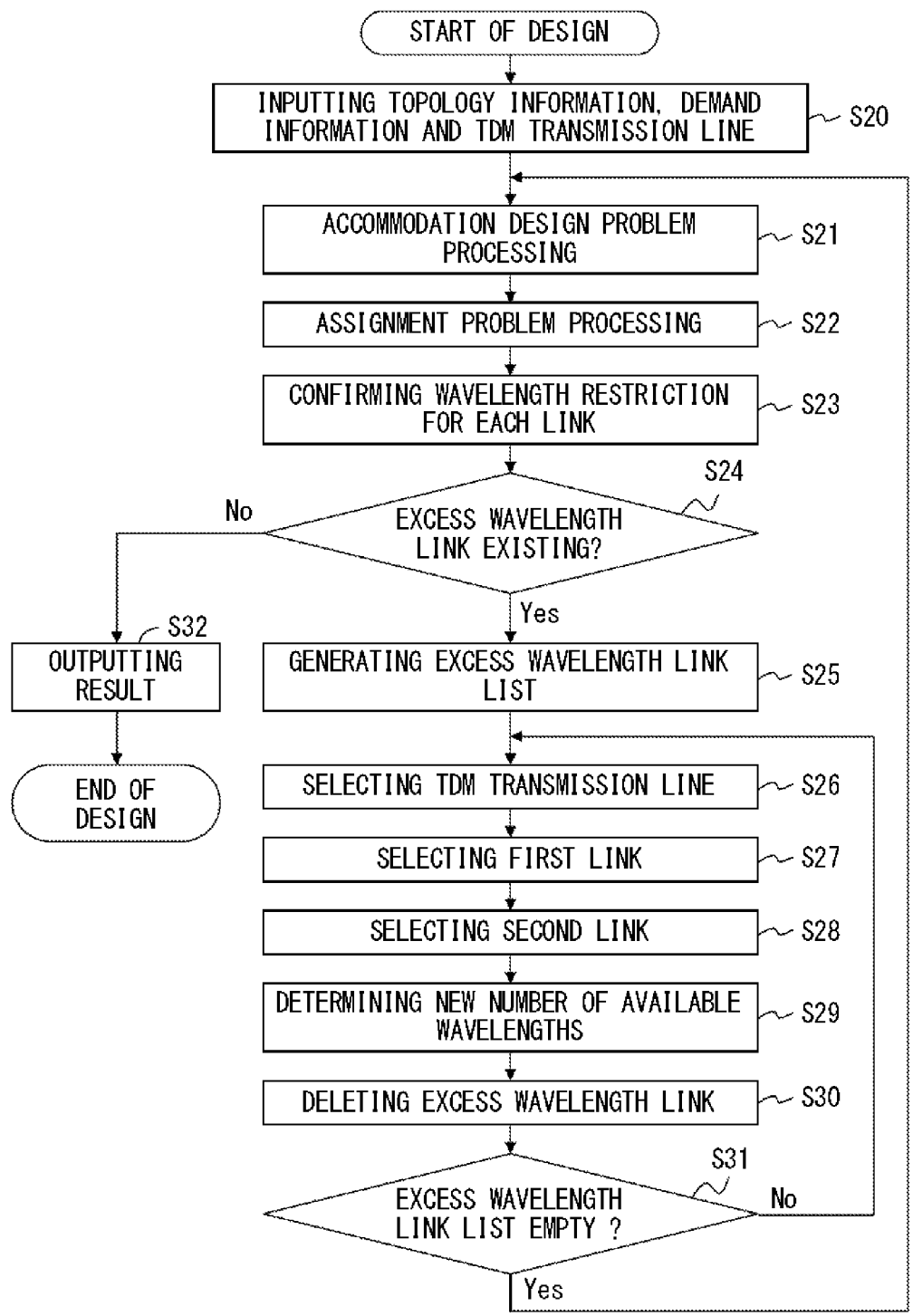
F I G. 7

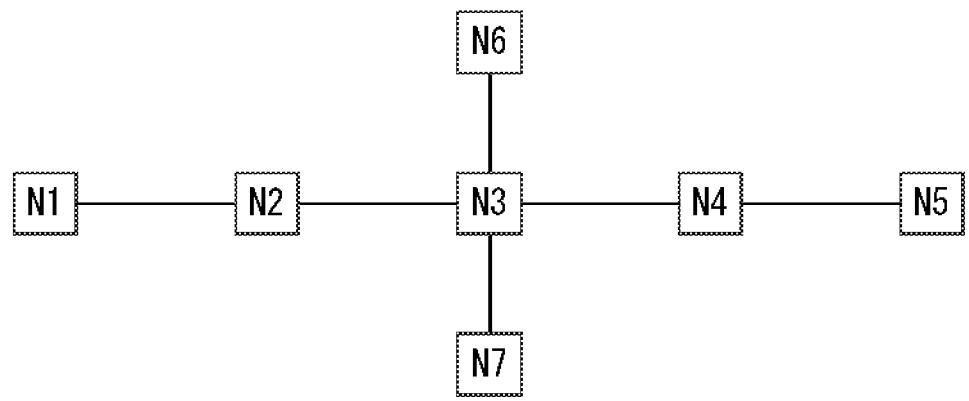
F I G. 8

| NODE NAME |
|---|
| N1 |
| N2 |
| N3 |
| N4 |
| N5 |
| N6 |
| N7 |

FIG. 9

| START POINT STATION | END POINT STATION | DISTANCE [km] | NUMBER OF AVAILABLE WAVELENGTHS |
|---|---|---|---|
| N1 | N2 | 5 | 9 |
| N2 | N3 | 6 | 9 |
| N3 | N4 | 4 | 9 |
| N4 | N5 | 7 | 9 |
| N6 | N3 | 8 | 9 |
| N3 | N7 | 3 | 9 |

F I G. 1 0

| START POINT STATION | END POINT STATION | BANDWIDTH | NUMBER | PATH |
|---|---|---|---|---|
| N1 | N2 | 6 | 5 | N1, N2 |
| N2 | N3 | 6 | 5 | N2, N3 |
| N4 | N5 | 6 | 8 | N4, N5 |
| N1 | N3 | 4 | 4 | N1, N2, N3 |
| N1 | N5 | 4 | 6 | N1, N2, N3, N4, N5 |
| N6 | N3 | 6 | 5 | N6, N3 |
| N6 | N7 | 4 | 10 | N3, N7 |

FIG. 11

| NUMBER | START POINT STATION | END POINT STATION | PATH |
|---|---|---|---|
| 1 | N1 | N2 | N1, N2 |
| 2 | N2 | N3 | N2, N3 |
| 3 | N4 | N5 | N4, N5 |
| 4 | N1 | N3 | N1, N2, N3 |
| 5 | N3 | N5 | N3, N4, N5 |
| 6 | N1 | N5 | N1, N2, N3, N4, N5 |
| 7 | N6 | N3 | N6, N3 |
| 8 | N3 | N7 | N3, N7 |
| 9 | N6 | N7 | N3, N7 |

FIG. 12

| CAPACITY | COST |
|---|---|
| 8 | 1 |
| 32 | 4.1 |

FIG. 13

| NUMBER | START POINT STATION | END POINT STATION | CAPACITY × NUMBER |
|---|---|---|---|
| 1 | N1 | N2 | 8 × 4 |
| 2 | N2 | N3 | 8 × 4 |
| 3 | N4 | N5 | 8 × 6 |
| 4 | N1 | N3 | 8 × 2 |
| 5 | N3 | N5 | 0 |
| 6 | N1 | N5 | 8 × 3 |
| 7 | N6 | N3 | 8 × 4 |
| 8 | N3 | N7 | 0 |
| 9 | N6 | N7 | 8 × 5 |

FIG. 15

| LINK | NUMBER OF TDM TRANSMISSION LINES | | |
|---|---|---|---|
| | CAPACITY 8 | CAPACITY 32 | TOTAL |
| N1-N2 | 4+2+3=9 | 0 | 9 |
| N2-N3 | 4+2+3=9 | 0 | 9 |
| N3-N4 | 3 | 0 | 3 |
| N4-N5 | 6+3 | 0 | 9 |
| N6-N3 | 4+5 | 0 | 9 |
| N3-N7 | 5 | 0 | 5 |

FIG. 16

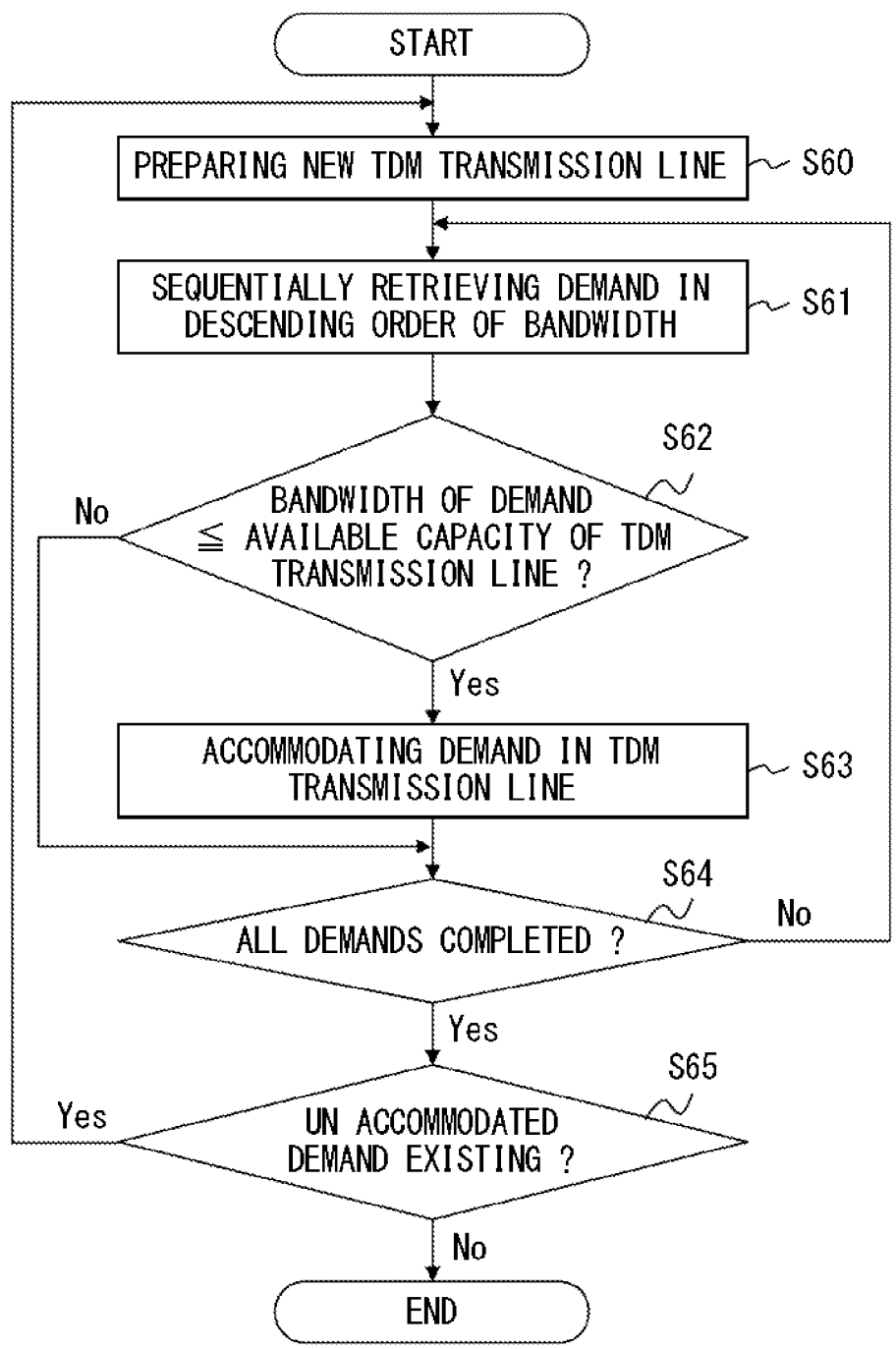
F I G. 1 7

| NUMBER | START POINT STATION | END POINT STATION | CAPACITY × NUMBER |
|---|---|---|---|
| 1 | N1 | N2 | 8 × 5 |
| 2 | N2 | N3 | 8 × 5 |
| 3 | N4 | N5 | 8 × 8 |
| 4 | N1 | N3 | 8 × 2 |
| 5 | N3 | N5 | 0 |
| 6 | N1 | N5 | 8 × 3 |
| 7 | N6 | N3 | 8 × 5 |
| 8 | N3 | N7 | 0 |
| 9 | N6 | N7 | 8 × 5 |

F I G. 1 8

| LINK | NUMBER OF TDM TRANSMISSION LINES | | |
|---|---|---|---|
| | CAPACITY 8 | CAPACITY 32 | TOTAL |
| N1-N2 | 5+2+3=9 | 0 | 10 |
| N2-N3 | 5+2+3=9 | 0 | 10 |
| N3-N4 | 3 | 0 | 3 |
| N4-N5 | 8+3 | 0 | 11 |
| N6-N3 | 5+5 | 0 | 10 |
| N3-N7 | 5 | 0 | 5 |

F I G. 1 9

| LINK |
|---|
| N1-N2 |
| N2-N3 |
| N4-N5 |
| N6-N3 |

FIG. 20

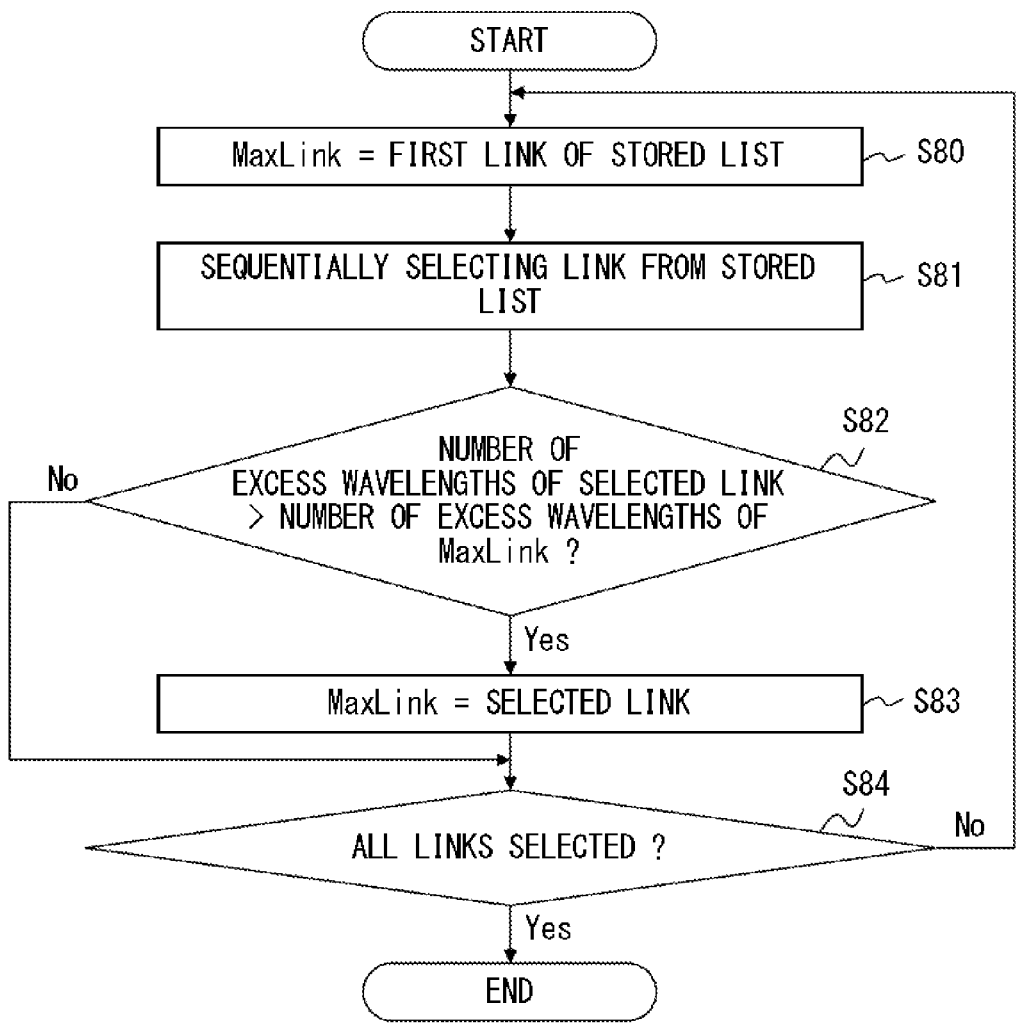
F I G. 2 2

| START POINT STATION | END POINT STATION | DISTANCE [km] | NUMBER OF AVAILABLE WAVELENGTHS |
|---|---|---|---|
| N1 | N2 | 5 | 8 |
| N2 | N3 | 6 | 9 |
| N3 | N4 | 4 | 9 |
| N4 | N5 | 7 | 7 |
| N6 | N3 | 8 | 8 |
| N3 | N7 | 3 | 9 |

FIG. 24

| NUMBER | START POINT STATION | END POINT STATION | CAPACITY × NUMBER |
|---|---|---|---|
| 1 | N1 | N2 | 8 × 5 |
| 2 | N2 | N3 | 8 × 5 |
| 3 | N4 | N5 | 8 × 8 |
| 4 | N1 | N3 | 8 × 2 |
| 5 | N3 | N5 | 0 |
| 6 | N1 | N5 | 32 × 1 |
| 7 | N6 | N3 | 32 × 1 |
| 8 | N3 | N7 | 0 |
| 9 | N6 | N7 | 8 × 5 |

F I G. 25

| LINK | NUMBER OF TDM TRANSMISSION LINES | | |
|---|---|---|---|
| | CAPACITY 8 | CAPACITY 32 | TOTAL |
| N1-N2 | 5+2 | 1 | 8 |
| N2-N3 | 5+2 | 1 | 8 |
| N3-N4 | 0 | 1 | 1 |
| N4-N5 | 8 | 1 | 9 |
| N6-N3 | 5 | 1 | 6 |
| N3-N7 | 5 | 0 | 5 |

FIG. 26

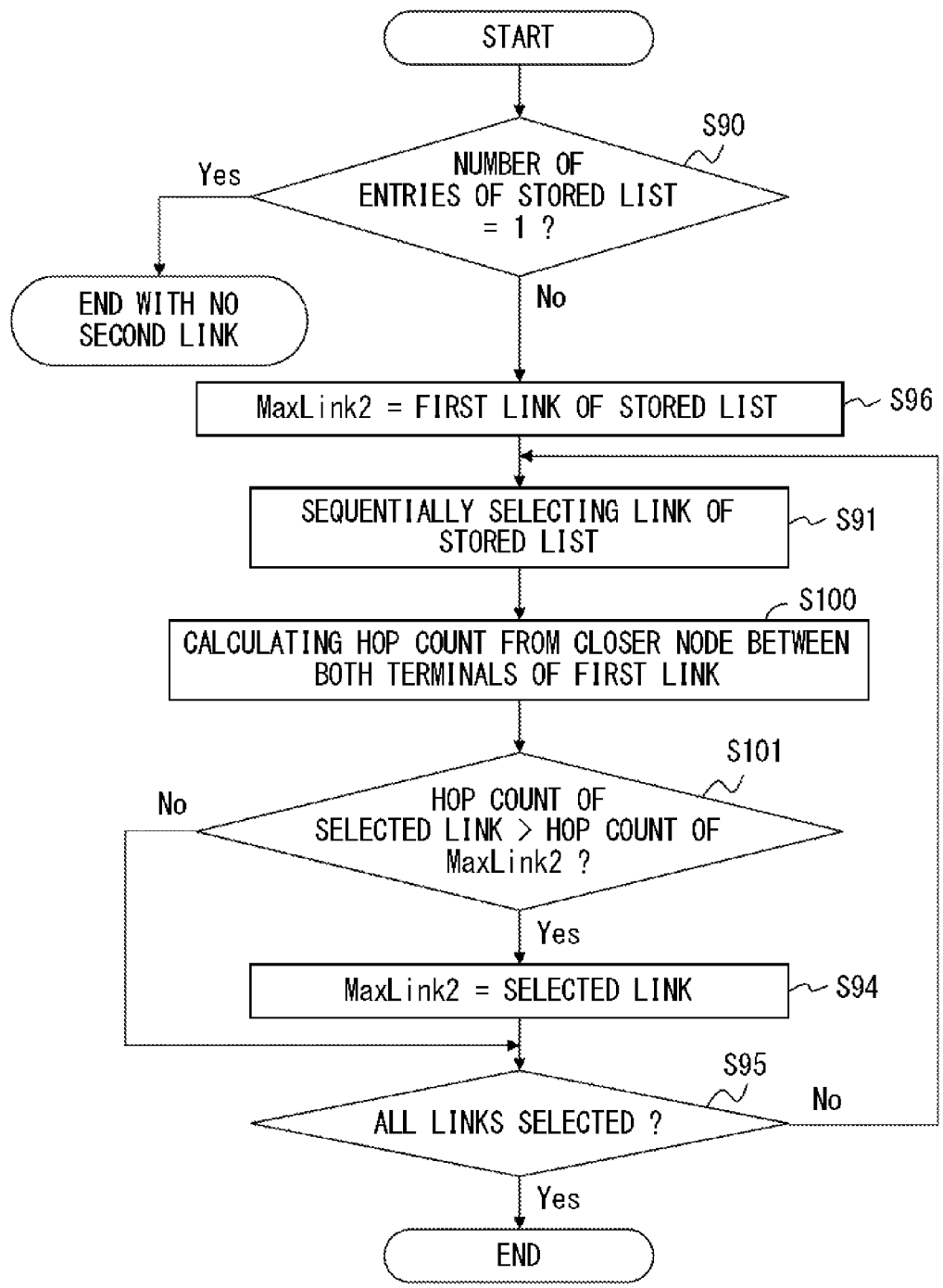
F I G. 2 7

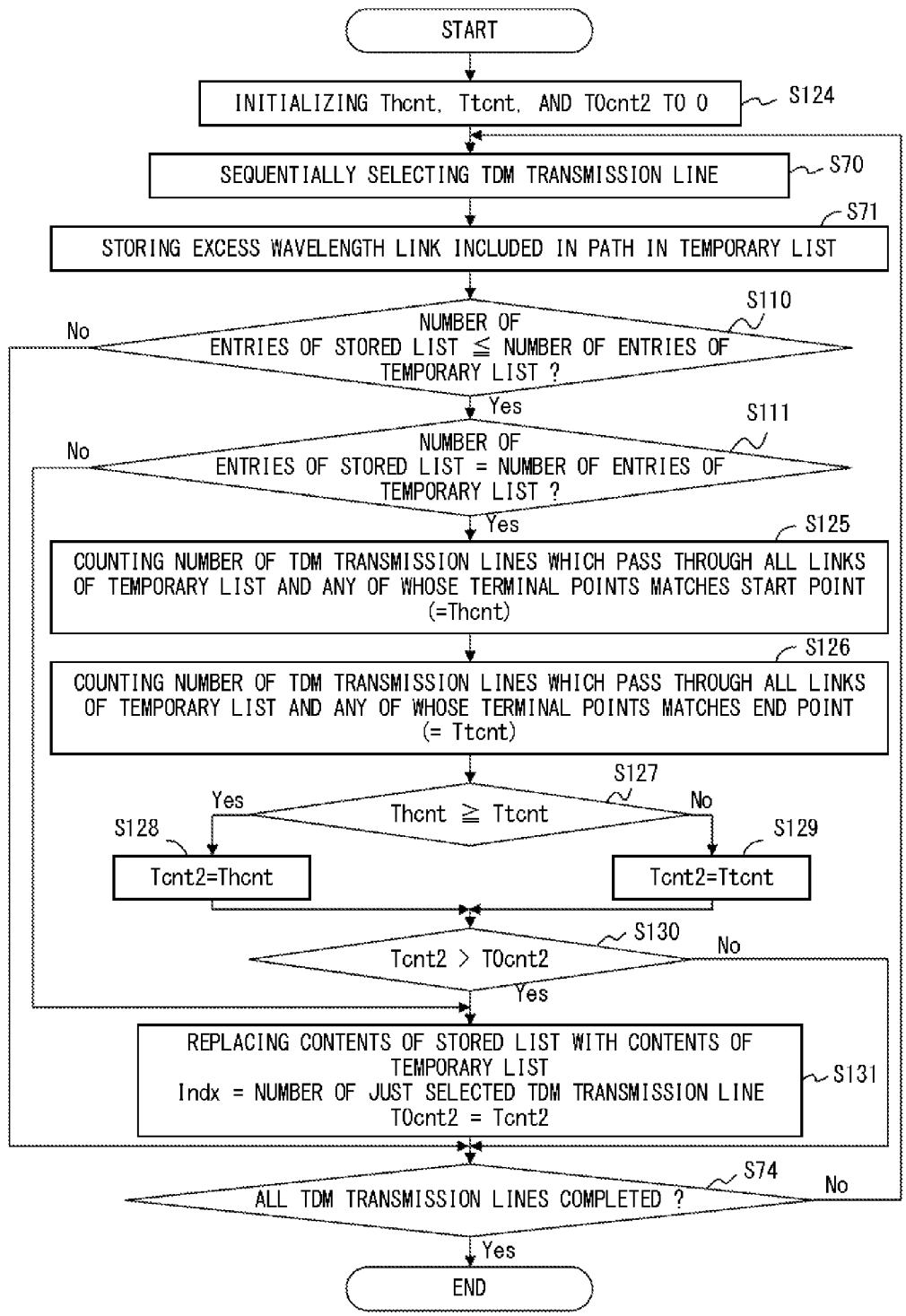
F I G. 3 1

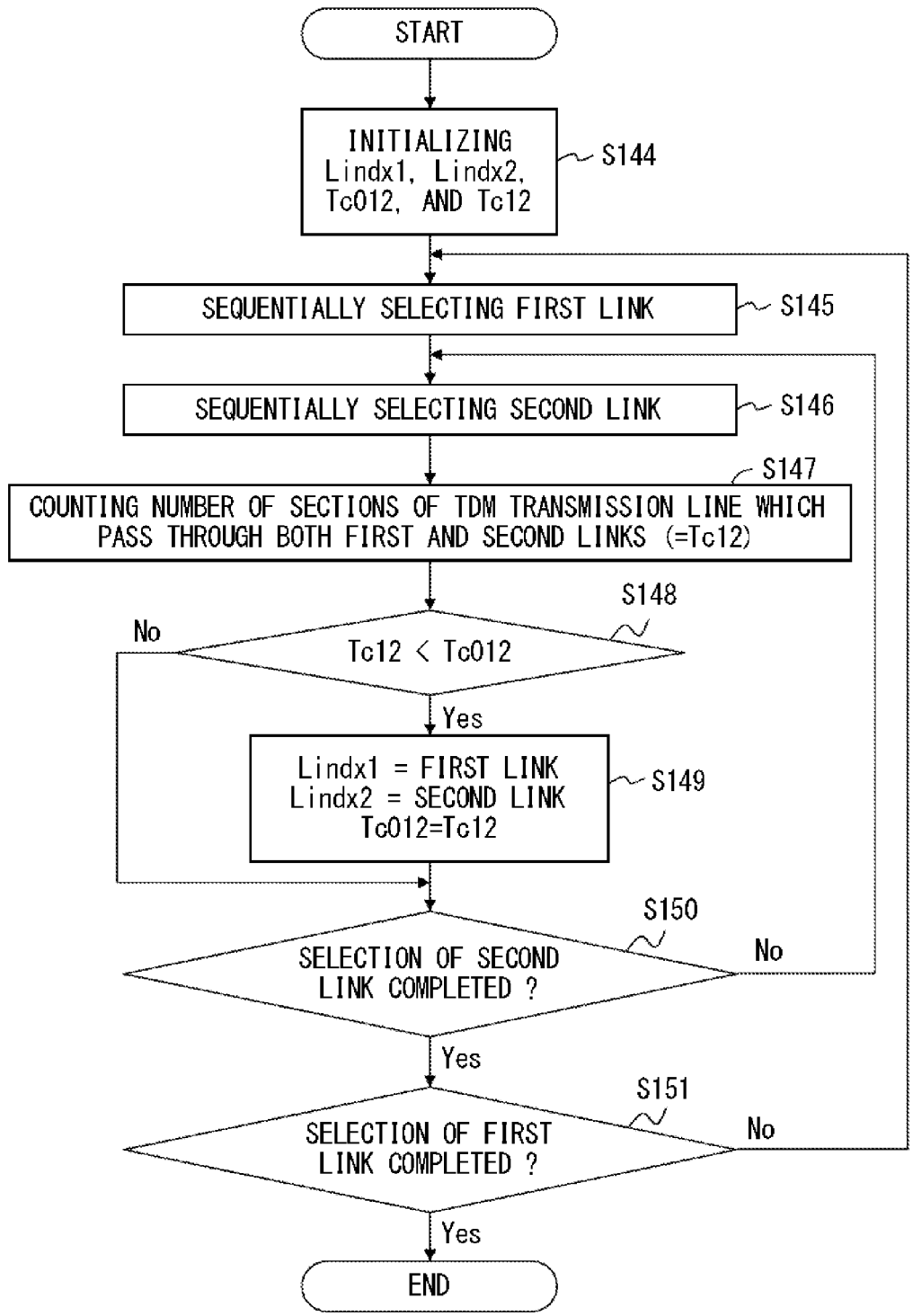
F I G. 34

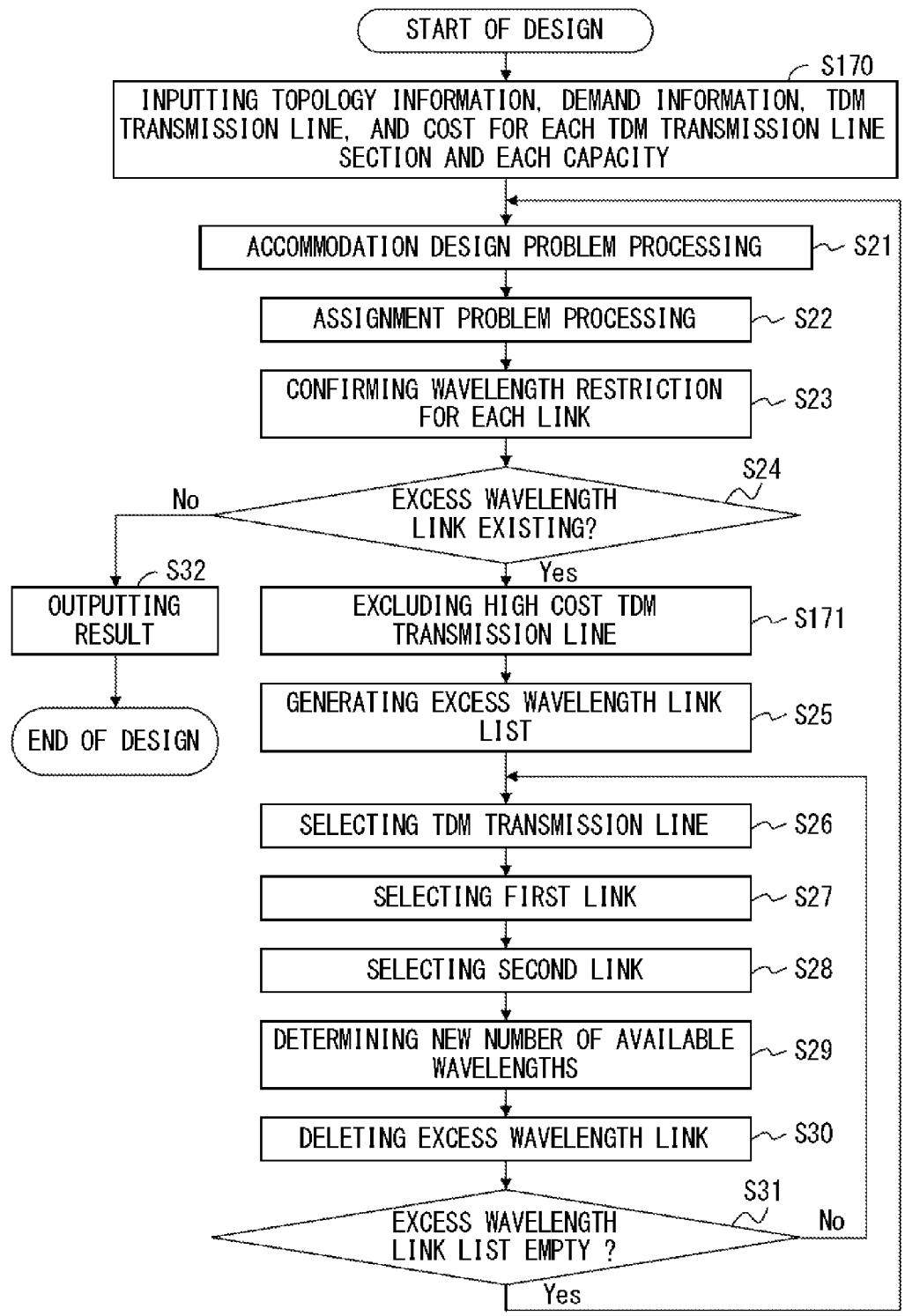
F I G. 3 7

| NUMBER | START POINT STATION | END POINT STATION | CAPACITY | COST |
|---|---|---|---|---|
| 1 | N1 | N2 | 8 | 1 |
| | | | 32 | 4.1 |
| 2 | N2 | N3 | 8 | 1 |
| | | | 32 | 4.1 |
| 3 | N4 | N5 | 8 | 1 |
| | | | 32 | 4.1 |
| 4 | N1 | N3 | 8 | 1 |
| | | | 32 | 4.1 |
| 5 | N3 | N5 | 8 | 1 |
| | | | 32 | 4.1 |
| 6 | N1 | N5 | 8 | 1 |
| | | | 32 | 8.2 |
| 7 | N6 | N3 | 8 | 1 |
| | | | 32 | 4.1 |
| 8 | N3 | N7 | 8 | 1 |
| | | | 32 | 4.1 |
| 9 | N6 | N7 | 8 | 1 |
| | | | 32 | 4.1 |

FIG. 38

| NUMBER | START POINT STATION | END POINT STATION | CAPACITY | COST |
|---|---|---|---|---|
| 1 | N1 | N2 | 8 | 0 |
|   |    |    | 32 | 0 |
| 2 | N2 | N3 | 8 | 0 |
|   |    |    | 32 | 0 |
| 3 | N4 | N5 | 8 | 0 |
|   |    |    | 32 | 0 |
| 4 | N1 | N3 | 8 | 0 |
|   |    |    | 32 | 0 |
| 5 | N3 | N5 | 8 | 0 |
|   |    |    | 32 | 0 |
| 6 | N1 | N5 | 8 | 0 |
|   |    |    | 32 | 1 |
| 7 | N6 | N3 | 8 | 0 |
|   |    |    | 32 | 0 |
| 8 | N3 | N7 | 8 | 0 |
|   |    |    | 32 | 0 |
| 9 | N6 | N7 | 8 | 0 |
|   |    |    | 32 | 0 |

F I G. 3 9

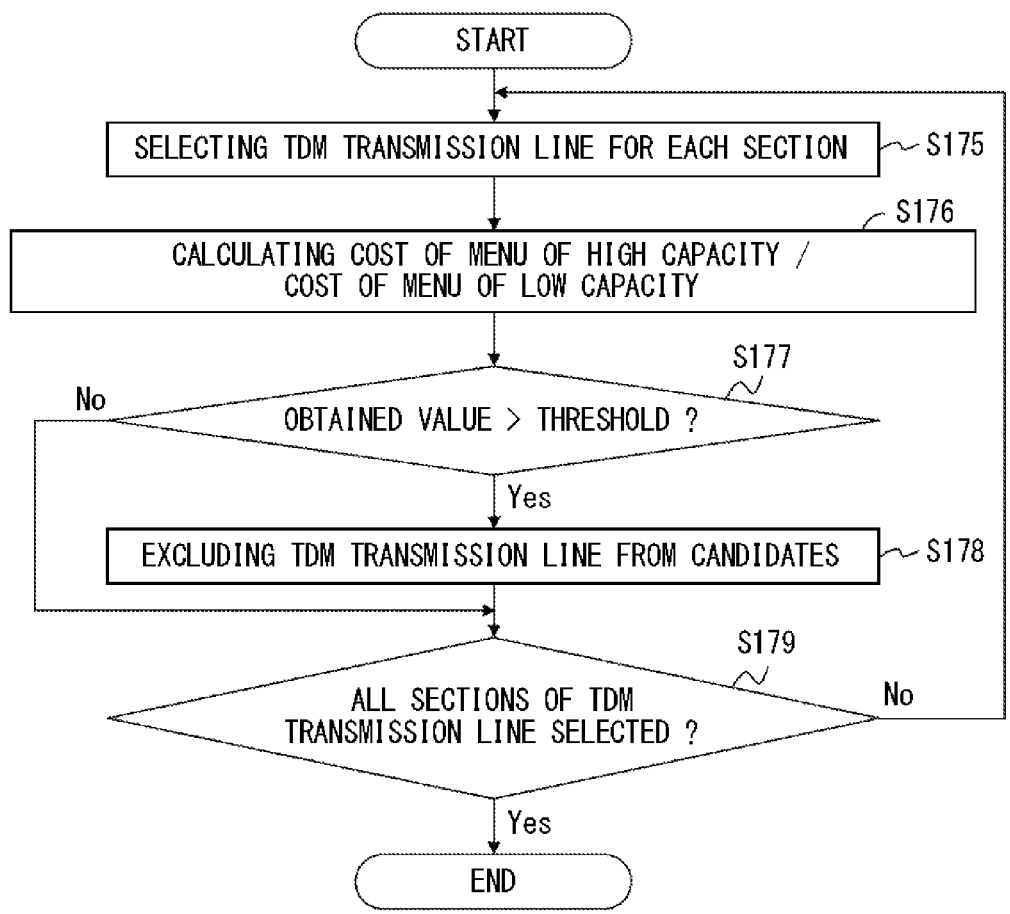
F I G. 40

| NUMBER | START POINT STATION | END POINT STATION | PATH | SELECTABILITY |
|---|---|---|---|---|
| 1 | N1 | N2 | N1, N2 | TRUE |
| 2 | N2 | N3 | N2, N3 | TRUE |
| 3 | N4 | N5 | N4, N5 | TRUE |
| 4 | N1 | N3 | N1, N2, N3 | TRUE |
| 5 | N3 | N5 | N3, N4, N5 | TRUE |
| 6 | N1 | N5 | N1, N2, N3, N4, N5 | FALSE |
| 7 | N6 | N3 | N6, N3 | TRUE |
| 8 | N3 | N7 | N3, N7 | TRUE |
| 9 | N6 | N7 | N3, N7 | TRUE |

F I G. 4 1

NETWORK DESIGN APPARATUS

CROSS-REFERENCE TO RELATED APPLICATIONS

This application is based upon and claims the benefit of priority of the prior Japanese Patent Application No. 2012-034093, filed on Feb. 20, 2012, the entire contents of which are incorporated herein by reference.

FIELD

The following embodiments are related to a network design apparatus.

BACKGROUND

When a subscriber line is accommodated using a TDM (time division multiplexing) technology, there is a technique to determine which TDM transmission line is used to accommodate the line. It is necessary to use the technique on the network for transmission using the TDM transmission line by a WDM (wavelength division multiplexing) technique.

Since the signal of the subscriber line accommodated in the TDM transmission line is called a traffic demand or simply a demand, the subscriber line accommodated in the TDM transmission line is called a demand in the following explanation.

When a signal (demand) of a subscriber line is transmitted using a fiber laid between the telephone stations, the demands for which a transmission may be performed using the same fiber are transmitted by multiplexing in the TDM transmission line the demands capable of being transmitted using the same fiber. In this case, it is necessary to determine which demand is to be multiplexed in which TDM transmission line. Thus, when a demand to be accommodated and a network topology are given, it is necessary to solve the problem to determine section and capacity of the TDM transmission line. The problem is hereafter referred to as an accommodation designing problem.

The recent communications are completely digitized, and a plurality of places are prepared for a signal called a time slot in the TDM transmission line. When a demand is assigned to the TDM transmission line, the number of time slots is determined depending on the bandwidth of the demand to be assigned. Therefore, when the demand to be accommodated in a given TDM transmission line is determined, it is necessary to prevent the total number of time slots required by the demand to be accommodated from exceeding the number of time slots prepared for the TDM transmission line. Furthermore, one TDM transmission line occupies one wavelength of the WDM, and the number of wavelengths which may be accommodated in one fiber depends on the system. Therefore, it is necessary to perform designing so that the number of TDM transmission lines does not exceed the number of wavelengths accommodated for each fiber.

Conventionally, an SDH (synchronous digital hierarchy) transmission line has been mainly used as a TDM transmission line. For the SDH, the smallest unit of the time slot such as an STM 1 is given, and the number of time slots of a demand is 1, 4, 16, etc. which indicates an integral multiple to one another, and is set as a value. In some cases, a demand uses an undivided number of time slots. In most of the cases, the demand is temporarily stored in a line in which the demand may be accommodated and the number of time slots is an integral multiple of time slots, and the accommodation line is multiplexed as a demand in the TDM transmission line.

Recently, an OTN (optical transport network) technique has been standardized. In the OTN, the accommodated demand may have the speed of any integral multiple of the minimum speed. That is, the demand having the number of time slots which does not indicate an integral multiple of the total number of time slots of the TDM transmission line and the number of time slots of another demand may be freely multiplexed.

There is a method for solving the accommodation designing problem by a mathematical programming under the conditions. When the mathematical programming is used, each TDM transmission line is prepared in advance to solve the problem as 0-1 programming by determining to use or not to use each line. Another method is to prepare in advance a section of the TDM transmission line defined by the start and end points and the path between them, and determine the number of necessary TDM transmission lines in the section for each speed. Then, the demand to be accommodated in each TDM transmission line is determined from the obtained number of TDM transmission lines and the list of demands to be accommodated. That is, the problem is solved by two stages. In the first method, a variable is assigned to each of the prepared TDM transmission lines. In the second method, a variable is assigned to each section of the TDM transmission line. Therefore, in the first method, the size of a network and the number of demands for practically solving the problem are considerably limited by the capacity of the equipment for performing computation. Accordingly, in a large recent network, the calculating time to solve the problem becomes unpractically very long. On the other hand, in the second method, the problem of determining the demand to be accommodated in each TDM transmission line is solved by solving a part of the original problem as another problem after determining the number of TDM transmission lines. In this case, there is a solution for accommodating all demands without fail in the TDM transmission lines of the number calculated from the number of time slots if the number of time slots required by the demand and the number of time slots prepared for the TDM transmission line indicate the relationship of integral multiples as in the case of the SDH. However, there occurs a case in which demands are not accommodated using the TDM transmission lines of the number calculated from the number of time slots by the demands which occur regardless of the relationship of integral multiples since the OTN technology has been used.

In the following explanation, the number of necessary time slots in accommodating a signal is expressed as the bandwidth of the demand, and the total number of time slots of the TDM transmission line is expressed as the capacity of the TDM transmission line. For example, assume that there are five demands to be accommodated, the number of respective bands is 6, and the capacity of the TDM transmission line is 8. Since there are five demands each having six bands, the total number of necessary time slots, that is, the total number of bands is 30. Therefore, if there are four TDM transmission lines each having the capacity of 8, the total number of time slots, that is, the total capacity, is 32 which permits the accommodation. However, since one demand is not divided for accommodation in two TDM transmission lines, only one demand having six bands may be accommodated in one TDM transmission line, thereby requiring five TDM transmission lines. Thus, since the bandwidth of a demand is not limited to the relationship of integral multiples, there may occur the case in which the number of TDM transmission lines increases when the demand to be accommodated in each TDM transmission line is determined in the course of solving the problem and determining the number of necessary TDM transmission lines.

In the above-mentioned method in which the problem is solved in two stages, the number of TDM trans mission lines does not exceed the number of wavelengths available in the WDM when the necessary number of TDM transmission lines is determined for each section in which the TDM transmission line at the first stage. Therefore, if the number of TDM transmission lines increases when the demand to be accommodated in each TDM transmission line at the second stage is determined, then the number of wavelengths available in the WDM is exceeded, thereby incurring a result of invalid design. For example, in the above-mentioned example, if the number of TDM transmission lines accommodated in the WDM is four, the number of necessary TDM transmission lines is four, which is the solution for the accommodation in the WDM. However, the number of TDM transmission lines is five when the signal to be accommodated in each TDM transmission line at the second stage is determined, which is the accommodation not allowed in the WDM network.

To avoid the problem, a TDM transmission line of a larger capacity is used. Conventionally, if the number of TDM transmission lines increases when the demand to be accommodated in each TDM transmission line at the second stage is determined, then a transmission line of a larger capacity is used. In the above-mentioned example, three TDM transmission lines of the capacity of 8 are prepared, and one more TDM transmission line of double capacity of 16 is prepared, two demands of the band of 6 are accommodated in the TDM transmission line of the capacity of 16, thereby accommodating a total of four TDM transmission lines. In this method, a solution is expected in most cases when a TDM transmission line of a large capacity is prepared. Therefore, it is a very simple method in which the process is performed only at the second stage when the problem is solved in two stages. The method is effective when it is rare that the number of TDM transmission lines exceeds the number of available wavelengths. However, when the number of TDM transmission lines frequently exceeds the number of wavelengths available in the WDM, an excess number of TDM transmission lines of a larger capacity may be used. Generally, a TDM transmission line of a large capacity is expensive, and consequently a costly network is designed.

FIGS. 1 through 6 are explanatory views of the prior art.

As illustrated in FIG. 1, the network is configured by five nodes, that is, nodes A, B, C, D, and E, and it is assumed that a WDM transmission line available up to eight waves of wavelength for a fiber is used for each of A-B, B-C, C-D, and D-E. In this case, the number of TDM transmission lines passing between A and B, B and C, C and D and D and E is eight, that is, a total of 64 in capacity. In the following explanation, the portion of the connection between the nodes is called a link. Each of the A-B, B-C, C-D, and D-E in FIG. 1 is a link.

Next, FIG. 2 illustrates a demand to be accommodated. The start and end points, the bandwidth, and the number of lines are listed. It is assumed that the TDM transmission line is provided between A and B, B and C, C and D, D and E, and A and E as illustrated in FIG. 3. In FIG. 3, the section indicated by the arrow is the section where the TDM transmission line is set. For simplicity, it is assumed that the demand between A and B is accommodated in the TDM transmission line between A and B, the demand between B and C is accommodated in the TDM transmission line between B and C, the demand between C and D is accommodated in the TDM transmission line between C and D, the demand between D and E is accommodated in the TDM transmission line between D and E, and the demand between A and E is accommodated in the TDM transmission line between A and E. The total bandwidth between A-B and D-E is 6 bands×5, that is, 30, as illustrated in FIG. 2, and the number of necessary TDM transmission lines in computation is four. In addition, the total bandwidth between B-C is 4 bands×4, that is, 16, and the number of necessary TDM transmission lines in computation is two. The total bandwidth between C-D is 2 bands×8 that is, 16, and the number of necessary TDM transmission lines in computation is two. The total bandwidth between A-E is 4 bands×8, that is, 32, and the number of necessary TDM transmission lines in computation is four. FIG. 4 illustrates the total number of TDM transmission lines obtained from the total bandwidth of the demand between A-B, B-C, C-D, and D-E. For example, in the case between A and B, four TDM transmission lines are used between A and B, and four TDM transmission lines are used between A and E, that is, a total of eight lines are used. In this case, no link exceeds the number of wavelengths available in the WDM.

Next, the demand to be accommodated in each TDM transmission line is determined. First, since two demands each having a bandwidth of 4 may be accommodated in two TDM transmission lines having the capacity of 8 between B and C, two TDM transmission lines may be used for accommodation as computed when each TDM transmission line is used for accommodation. Furthermore, since two demands each having a bandwidth of 4 may be accommodated in two TDM transmission lines having the capacity of 8 between C and D, two TDM transmission lines may be used for accommodation as computed. Similarly, two demands each having a bandwidth of 4 may be accommodated in four TDM transmission lines having the capacity of 8 between A and E. However, between A and B and between D and E, the number of TDM transmission lines calculated from the total bandwidth is four, but five lines are required when each TDM transmission line is practically used for accommodation. That is, between A and B and between D and E, six bands are used for the demand. Therefore, the TDM transmission line having the capacity of 8 may accommodate only one demand. Accordingly, five TDM transmission lines are required for five demands. Therefore, although FIG. 5 illustrates the number of practically necessary TDM transmission lines, the number of wavelengths available for the WDM is exceeded between A and B and between D and E.

Thus, in the prior art technology, the number of necessary TDM transmission lines is reduced to the original number using the TDM transmission line having a larger capacity for the section in which the number of TDM transmission lines is exceeded in the TDM transmission lines which pass through the link where the number of TDM transmission lines has exceeded the number of wavelengths available for the WDM.

FIG. 6 is a flowchart of the prior art.

The network information such as the topology, the demand to be accommodated, the section in which a TDM transmission line is set, etc. is input (step S10). Next, the accommodation designing problem is solved to determine the number of TDM transmission lines in each section (step S11). Then, the demand to be accommodated in each TDM transmission line is determined (step S12). Then, each link is checked whether or not the number of TDM transmission lines has exceeded the number of wavelengths available in the WDM (step S13). If there is no link in which the number of TDM transmission lines has exceeded the number of wavelengths available in the WDM, the process is terminated. If there is a link in which the number of TDM transmission lines has exceeded the number of wavelengths available in the WDM, the section of the TDM transmission line which passes through the link in which the number of TDM transmission lines exceeds the number of available wavelengths is listed (step S14). Then, the sections are sequentially retrieved (step S15), and it is checked whether or not the number of TDM transmission lines has increased when the demand to be accommodated in each TDM transmission line is determined from the number of the TDM transmission lines when the number of TDM transmission lines for each section is determined (step S16). If the number has not increased, control, is passed to step S18. If the number has increased, a TDM transmission line of a larger capacity is applied so that the number of TDM transmission lines may be equal or less than the original value for the section (step S17). In step S18, it is determined whether or not the process has been completed for all sections in which the number of wavelengths is exceeded. If NO, control is returned to step S15, and the process is continued. If YES, the process is terminated.

In the case illustrated in FIG. 5, since the number of TDM transmission lines increases for the links between A and B and between D and E, for example, the TDM transmission line of the capacity of 16 is used. If one TDM transmission line of the capacity of 16 is used in addition to three TDM transmission lines of the capacity of 8, all demands may be accommodated, and the total number of TDM transmission lines is four which is the original number of lines.

In the prior art, the TDM transmission line of the capacity of 16 is used at two points between A and B and between D and E. However, as another solution, one TDM transmission line of the capacity of 16 is used as the TDM transmission line between A and E. In this case, the total number of TDM transmission lines between A and E is three. Although the number of TDM transmission lines between A and B and between D and E increases to five, the number of TDM transmission lines between A and E is three. Therefore, the total number of TDM transmission lines between A and B and between D and E is eight. Accordingly, the total number does not exceed the number of wavelengths available for the WDM, and the number of TDM transmission line of the capacity of 16 is one. Thus, in the prior art, the optimum solution that a result of less expensive design is obtained without a TDM transmission line of a larger capacity is not attained. Therefore, the technique of obtaining the optimum solution has been requested in the case above.

The prior art may reduce the resources by a specified rate from the result of facility design and obtain as a solution an optical network facility having the largest reduction amount while satisfying the allowable value of the bypass amount of an optical path or the number of unallowable paths.

DOCUMENTS OF PRIOR ART

Patent Document

[Patent Document 1] Japanese Laid-open Patent Publication No. 2005-86675

In the prior art, when the number of TDM transmission lines exceeds the number of wavelengths available for the WDM in a link, a TDM transmission line of a larger capacity is applied for each TDM transmission line. Therefore, there is an unnecessarily large number of points where a TDM transmission line of a larger capacity is used, thereby incurring a result of costly design.

SUMMARY

The network design apparatus according to an aspect of the following embodiments is used in a network which accommodates a TDM (time divisional multiplexing) transmission line using a plurality of wavelengths in a wavelength division multiplexing technique, and includes: an accommodation design problem processing unit which receives at least the information about a demand, an upper limit of the number of wavelengths available for each link, and the TDM transmission line information, and obtains the number of necessary TDM transmission lines to accommodate all demands for each link so that the number of wavelengths is not exceeded for each link; an assignment problem processing unit which determines a demand to be accommodated in each TDM transmission line from the number of obtained TDM transmission lines and the demand to be accommodated; and an iterative process unit which repeats a process of setting a constraint with the number of wavelengths available for a first link having the largest exceeding number of wavelengths and a second link farthest from the first link reduced in a link in which the number of TDM transmission lines exceeds the number of wavelengths available when a demand is accommodated in the process of the assignment problem processing unit, and allows the accommodation design problem processing unit and the assignment problem processing unit to perform designing again under a changed constraint.

The following embodiments provide a network design apparatus capable of minimizing the number of points in which a TDM transmission line of a larger capacity is used.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is an explanatory view (1) of the prior art;
FIG. 2 is an explanatory view (2) of the prior art;
FIG. 3 is an explanatory view (3) of the prior art;
FIG. 4 is an explanatory view (4) of the prior art;
FIG. 5 is an explanatory view (5) of the prior art;
FIG. 6 is an explanatory view (6) of the prior art;
FIG. 7 is an explanatory view (1) of the first configuration example of an embodiment of the present invention;
FIG. 8 is an explanatory view (2) of the first configuration example of an embodiment of the present invention;
FIG. 9 is an explanatory view (3) of the first configuration example of an embodiment of the present invention;
FIG. 10 is an explanatory view (4) of the first configuration example of an embodiment of the present invention;
FIG. 11 is an explanatory view (5) of the first configuration example of an embodiment of the present invention;
FIG. 12 is an explanatory view (6) of the first configuration example of an embodiment of the present invention;
FIG. 13 is an explanatory view (7) of the first configuration example of an embodiment of the present invention;
FIG. 15 is an explanatory view (9) of the first configuration example of an embodiment of the present invention;
FIG. 16 is an explanatory view (10) of the first configuration example of an embodiment of the present invention;
FIG. 17 is an explanatory view (11) of the first configuration example of an embodiment of the present invention;
FIG. 18 is an explanatory view (12) of the first configuration example of an embodiment of the present invention;

FIG. 19 is an explanatory view (13) of the first configuration example of an embodiment of the present invention;

FIG. 20 is an explanatory view (14) of the first configuration example of an embodiment of the present invention;

FIG. 22 is an explanatory view (16) of the first configuration example of an embodiment of the present invention;

FIG. 24 is an explanatory view (18) of the first configuration example of an embodiment of the present invention;

FIG. 25 is an explanatory view (19) of the first configuration example of an embodiment of the present invention;

FIG. 26 is an explanatory view (20) of the first configuration example of an embodiment of the present invention;

FIG. 27 is an example of the flowchart of selecting the second link in the second configuration example;

FIG. 31 is an example of the flowchart of selecting a TDM transmission line in the sixth configuration example;

FIG. 34 is an example of the flowchart of the portion in which the first and second links corresponding to an example of the eighth configuration are selected;

FIG. 37 is a flowchart corresponding to an example of the eleventh configuration;

FIG. 38 is an example (1) of the cost for each section and each capacity of a TDM transmission line;

FIG. 39 is an example (2) of the cost for each section and each capacity of a TDM transmission line;

FIG. 40 is a flowchart of excluding a high-cost TDM transmission line;

FIG. 41 is an example of a method of excluding a candidate of selecting a TDM transmission line;

DESCRIPTION OF EMBODIMENTS

Figure 14:
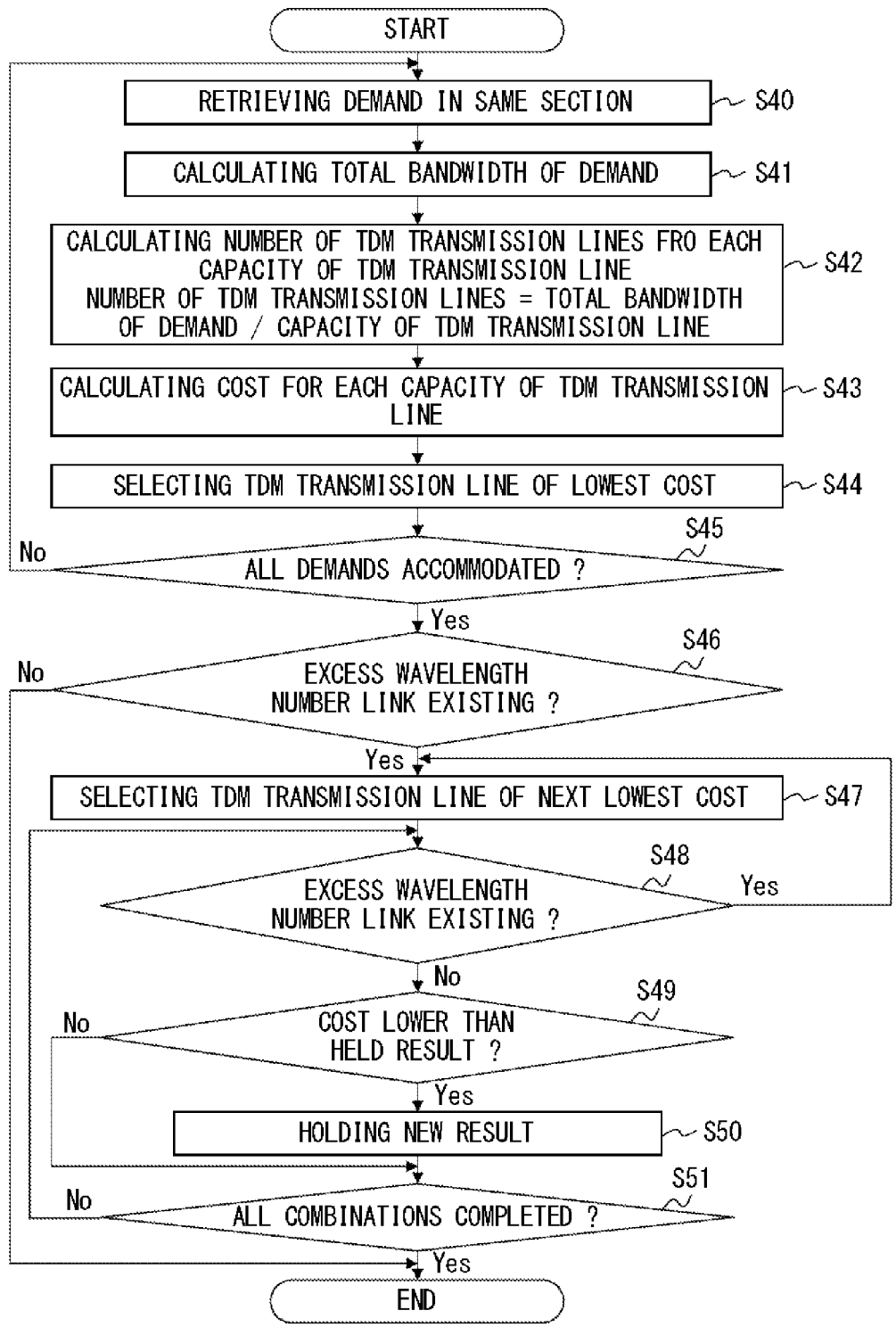
FIG. 14 is an explanatory view (8) of the first configuration example of an embodiment of the present invention.

FIGS. 7 through 26 are explanatory views of an example of the first configuration according to an embodiment of the present invention.

In an example of the first configuration, when the number of TDM transmission lines exceeds the number of wavelengths available in a link, the link in which the number of TDM transmission lines exceeds the number of wavelengths available in the link is listed. Then, the TDM transmission line including the largest number of links in the list is selected. Then, in the path of the TDM transmission line, the link having the largest difference between the number of TDM transmission lines and the number of wavelengths in the links in which the number of TDM transmission lines exceeds the number of wavelengths available in the link is selected as the first link. Furthermore, the link located farthest from the selected first link, in the path of the selected TDM transmission line, and having the number of TDM transmission lines exceeding the number of wavelengths available in the link is selected as the second link. Then, for the selected first and second links, the value obtained by reducing the number of wavelengths available in the link by the number of TDM transmission lines exceeding the number of wavelengths available in the link is set as the number of wavelengths available in the link, and the designing process is performed again. Thus, a result of design may be obtained by minimizing the number of the portions in which a TDM transmission line of a larger capacity is used.

Although there are a plurality of links in which the number of TDM transmission lines exceeds the number of wavelengths available in the link, a result of design may be obtained by minimizing the number of the portions in which a TDM transmission line of a larger capacity is used.

Figure 9:
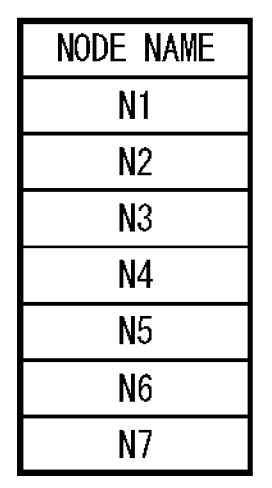

In FIG. 7, the topology information, the demand information, and the TDM transmission line information are first input (step S20). FIG. 8 is an example of the topology. FIGS. 9 and 10 are examples of the topology information. The topology is the information about a node and a link. FIG. 9 is an example of a list of nodes. FIG. 10 is a list of links, and includes the information about the nodes of the start and end points, the distance (length of fiber between stations), the number of available wavelengths.

FIG. 11 is an example of a demand. The demand information is configured by the information about the start and end points, the bandwidth, the number of lines, and the path. There are some method of expressing the information about a path. In this example, the nodes on the path are expressed by sequentially arranging from the start point to the end point. In addition, there is a method of sequentially listing the names of passing links and a method of listing the names of nodes and links in the passing order.

Figure 13:
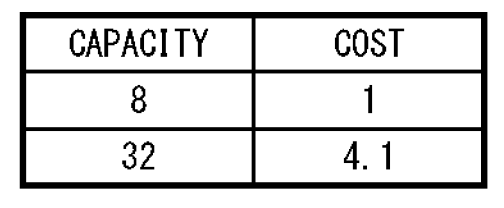

The TDM transmission line information indicates the section in which the TDM transmission line is set. FIG. 12 is an example of the information about the TDM transmission line, which is configured by the information about the start and end points and the path. Since the number of TDM transmission lines to be used depends on the design, the TDM transmission line which is not used as a result of design, that is, there may be some TDM transmission lines not counted as practical lines. FIG. 12 illustrates the columns of the section numbers of the TDM transmission line for later explanation, but is not specifically necessary as the information to be input. In addition, for the accommodation design problem processing, the information available as TDM transmission lines having different capacities and the information about the costs are input for the accommodation design problem processing. FIG. 13 is an example of the information about the capacity and the cost of the TDM transmission line;

Next, in the accommodation design problem processing (step S21 in FIG. 7), the number of necessary TDM transmission lines to accommodate a demand is calculated for the section of each TDM transmission line. In the accommodation design problem processing, the method using an algorithm by a heuristic approach and a method using the mathematical programming, etc. may be used. The simplest method is to divide a demand into sections and accommodate each section in the TDM transmission line in the same section as the demand. FIG. 14 is an example of the flowchart.

First, the demand of the same start and end points and the same path are retrieved (step S40), and a total bandwidth of the demand is calculated (step S41). Demands of different bands may coexist so far as the same start and end points and the same path are used. The total bandwidth may be obtained by the product of the bandwidth and the number of the demands.

For example, there are five demands of six bands in the case of the demand from N1 to N2 in FIG. 11, a total of 30 (5×5) bands are used. Next, the value obtained by dividing the total bandwidth by the capacity of the TDM transmission line and rounding up the quotient to an integer indicates the number of necessary TDM transmission lines (step S42). For example, in the case of the demand from N1 to N2, a total of 30 bands are used, and the capacity of the TDM transmission line is 8 and 32 as illustrated in FIG. 13. For the capacity of 8, the number is 4. For the capacity of 32, the number is 1. Next, the cost is calculated (step S43). For example, if the cost per line is 1 and the number of lines is 4 when the capacity of the TDM transmission line is 3 with the demand from N1 to N2, the cost is 4. In the case of the TDM transmission line of the capacity of 32, the cost per line is 4.1 and the number of line is 1. Therefore, the cost is 4.1. Next, the least inexpensive TDM transmission line is selected (step S44). For example, with the demand from N1 to N2, the cost is low for the TDM transmission line of the capacity of 8. Therefore, the TDM transmission line of the capacity of 8 is selected.

In step S45, it is determined whether or not all demands have been accommodated. Unless all demands have been accommodated, control is returned to step S40 and the processes are repeated. If all demands have been accommodated, then it is confirmed whether or not the number of wavelengths available for each link is exceeded (step S46). Unless it is not exceeded, the accommodation of each TDM transmission line is the lowest in cost. Therefore, the designing process terminates. If it has been exceeded, the second lowest TDM transmission line in cost is sequentially selected (step S47). In this case, the possible combination is sequentially attempted, and the TDM transmission line not exceeding the number of wavelengths available for each link and requiring a lower cost is held. That is, in step S48, when there is a link in which the number of wavelengths is exceeded, a reselection is made in step S47. If there is no such link, it is determined in step S49 whether or not the cost is lower. If the cost is not lower in step S49, control is passed to step S51. If the cost is lower, the result is held, and control is passed to step S51. If the cost is low, the result is held, and control is passed to step S51. In step S51, it is determined whether or not the process has been completed on all combinations. If the processes have not been completed, control is returned to step S48, and the processes are repeated. If all combinations have been completed, the design terminates.

FIG. 15 illustrates the result of obtaining necessary TDM transmission lines. Although the number of TDM transmission lines having the numbers of 5 and 8 is 0, it indicates that since no TDM transmission line is required in this section to accommodate the demand, no line has been used. FIG. 16 illustrates the number of passing TDM transmission lines for each link. For example, in the case of the link N1-N2, since there are four TDM transmission lines 1 between N1 and N2, two TDM transmission lines 4 between N1 and N3, and three TDM transmission lines 6 between N1 and N5, a total of nine TDM transmission lines having a capacity of 8 are used.

In addition, there is a method of solving a problem using mixed integer programming. An example of the method using the mixed integer programming is described below. Assume that the capacity menu of the TDM transmission line is m. For example, it is determined that m=1 refers to the capacity of 8, m=2 refers to the capacity of 32, etc. In addition, assume that the number of the TDM transmission line is h, and $x_m(h)$ refers to the number of TDM transmission lines h of the capacity menu m. For example, the TDM transmission line 2 having the capacity of 8 between N2 and N3 is expressed by $x_m(2)$. $cost_m$ indicates the cost of the TDM transmission line of the capacity menu m, and the value of the column of the cost in FIG. 13. Using the notation, the objective function for obtaining the minimum cost solution of the TDM transmission line is described as follows.

[math 1]

$$\text{minimize} \sum_m \left\{ \sum_h cost_m x_m(h) \right\} \text{ (for } \forall m, \forall h)$$

Described next is the constraint of a demand.

[math 2]

$$\sum_t T(l, t) \cdot d(t) = numberOfDemands \text{ (for } \forall l)$$

Assume that T(1,t) is a variable of 1 when the demand 1 is accommodated in the demand accommodation pattern t, and a variable of 0 otherwise.

Unlike the case in which it is determined in advance that a demand is to be accommodated in a given TDM transmission line as described above in a method by a heuristic approach, it is assumed in this case that there are some methods of accommodating a demand. Therefore, for example, for a demand from N1 to N3, there are an accommodating method using the TDM transmission line N1-N3 and an accommodating method using two TDM transmission lines N1-N2 and N2-N3. "t" indicates the collection of accommodation patterns on all demands. "d(t)" indicates the number of demands to be accommodated by the demand accommodation pattern t. For example, assume that t=1 indicates the case in which the TDM transmission line N1-N3 is used, t=2 indicates the case in which two TDM transmission lines N1-N2 and N2-N3 are used, and there are four demands l=1 from N1 to N3, it is expressed by T(1,1)d(1)+T(1,2)d(2)=4. Since T(1,1) and T(1, 2) are 1, the equation d(1)+d(2)=4 holds, and there are a total of four demands to be accommodated as the demands to be accommodated in the pattern t=1 and the demands to be accommodated in the pattern t=2. That is, the four demands are accommodated in the pattern t=1 or t=2.

Described below is the constraint on the capacity for each TDM transmission line.

[math 3]

$$\sum_t Demand\_Cap(t) \cdot I(h, t) \cdot d(t) - \sum_m TDM\_CAP(m) \cdot x_m(h) \leq 0$$

$$\text{(for } \forall h)$$

Demand_Cap(t) indicates the demand bandwidth for the demand accommodation pattern t. I(h,t) is 1 when the TDM transmission line h is included in the demand accommodation pattern t, and is 0 when it is not included in the demand accommodation pattern t. Although there are two demand accommodation patterns for the demand from N1 to N3, there are similarly the patterns, for example, from N1 to N5, that is, N1-N2, N2-N3, and N3-N5, or N1-N3 and N3-N5, or N1-N5. Among them a TDM transmission line is used for a plurality of demand accommodation patterns. Therefore, for example, the TDM transmission line N1-N3 accommodates the demand accommodated by the demand accommodation pattern N1-N3 for the demand from N1 to N3 and the demand accommodated by the demand accommodation patterns N1-N3 and N3-N5 for the demand from N1 to N5, Therefore, the first term of the equation of the math 3 indicates sum of the product of the demand bandwidths and the total number of demands accommodated in the demand accommodation pattern t for the demand accommodation pattern t including the TDM transmission line h, that is, the total bandwidth of the demands accommodated in the TDM transmission line h. TDM_CAP(m) indicates the capacity of the TDM transmission line of the capacity menu m. In the case above, m=1 indicates the capacity of 8, m=2 indicates the capacity of 32. The second term indicates the total capacity of the TDM transmission line h of the capacity menu m, and the entire equation refers to that the total bandwidth of the demands accommodated in the TDM transmission line does not exceed the total capacity of the TDM transmission line.

Described next is the constraint equation for limiting the number of wavelengths of the link.

[math 4]

$$\sum_h \left[ \text{Link}(s, h) \cdot \left\{ \sum_m x_m(h) \right\} \right] \leq \text{Wavelength}(s) \text{ (for } \forall s\text{)} \quad \text{(equation 1)}$$

Link(s,h) indicates 1 when the TDM transmission line h passes through the link s, and indicates 0 when the TDM transmission line h does not pass through the link s. The left side of the equation of the math 4 indicates the total number of TDM transmission lines which passes through the link s. Wavelength(s) indicates the number of wavelengths available in the link s. In the present embodiment, when the design is reconsidered, the value of Wavelength(s) is changed.

By solving the above-mentioned objective function and three constraint equation by the mixed integer programming, the number $x_m(h)$ of each TDM transmission line is obtained. The solving method of the mixed integer programming is commonly known, and may be solved by the method described in the following references.

"Optimization for Discrete System" by Masatoshi Sakawa, published by Morikita Publishing Co. Ltd., published in May 2000

Furthermore, there are a number of solvers for the mathematical programming such as the mixed integer programming, etc. which is available excluding that dedicated for special uses. For example, the following free software and commercially available solvers are used.

GLPK: free software (http://www.gnu.org/s/glpk/)

CPLEX: commercially-available software (currently released by IBM since old ILOG and ILOG have been acquired by IBM)

Next, in the assignment problem processing (step S22 in FIG. 7), a demand to be accommodated in each TDM transmission line is determined. FIG. 15 illustrates the number of necessary TDM transmission lines. Since it is assumed for example that the demands to be accommodated have the same TDM transmission line, start and end points, and path, there are five demands from N1 to N2 (FIG. 11) in the case of, for example, the first TDM transmission line. The method of determining the demand accommodated in each TDM transmission line is a method etc. using the bin packing problem in the heuristic approach and the mathematical programming.

The algorithm of the method of solving the bin packing problem is described in, for example, the following document.

"Approximation Algorithm" by V. V. Vazirani translated by Takao Asano, pp 76-80, Springer Japan, November 2002

FIG. 17 is an example of a flowchart of determining the demand to be accommodated in each TDM transmission line by the heuristic approach.

A new TDM transmission line is prepared (step S60, initializing data indicating new TDM transmission line), retrieving demands in a descending order of bandwidths (step S61), and accommodating them in free capacity of TDM transmission lines (steps S62 and S63). In step S64, it is determined whether or not the process has been completed on all demands. If not, control is returned to step S61, and the processes are repeated. When all demands are processed, it is determined in step S65 whether or not there are any unaccommodated demands. If there are any unaccommodated demands, a new TDM transmission line is prepared, and the processes are repeated. If there is no unaccommodated demand, the process terminates.

FIG. 18 illustrates the number of TDM transmission lines after the demands are assigned to each TDM transmission line. For example, in the case of N1-N2, when there are five demands of bandwidth 6, since one demand is not accommodated after dividing one demand into a plurality of TDM transmission lines, each demand of the bandwidth 6 is assigned to a TDM transmission line of the capacity of 8, thereby requiring a total of five TDM transmission lines. Similarly, the TDM transmission lines N2-N3 and N6-N3 are processed. In the case of the TDM transmission line N4-N5, there are eight demands of bandwidth 6, it is necessary to prepare six TDM transmission lines of the capacity of 8 for the bands. However, as described above, a demand is not accommodated after dividing it into a plurality of TDM transmission lines, it is practically necessary to prepare two more TDM transmission lines, that is, eight TDM transmission lines.

FIG. 19 illustrates the number of TDM transmission lines passing through the respective links after determining the demand to be accommodated in each TDM transmission line. In FIG. 19, the bold underlined characters indicate the case in which the number of TDM transmission lines exceeds the number of wavelengths of 9 available in the link.

Figure 20:
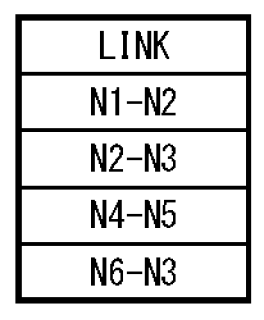

Next, according to the present embodiment, the restriction of the number of wavelengths for each link is confirmed (step S23 in FIG. 7). In step S24 in FIG. 7, it is determined in step S24 in FIG. 7 whether or not there is a link in which the number of TDM transmission lines exceeds the number of wavelengths. If the number of TDM transmission lines in the links is smaller than the number of wavelengths in all links, then the designing process terminates by outputting the result in step S32 in FIG. 7. If there is any link in which the number of TDM transmission lines exceeds the number of wavelengths available in the link, an excess wavelength link list is generated. (step S25 in FIG. 7). For example, when a result as illustrated in FIG. 19 is obtained, the number of TDM transmission lines passing through the respective links exceeds the number of wavelengths available in the links N1-N2, N2-N3, N4-N5, and N6-N3. Therefore, the excess wavelength link list as illustrated in FIG. 20 is generated. In FIG. 20, a link is specified by the start and end points of the link. However, when the link is provided with an identifier and an identification number, the identifier and the identification number may replace the points.

Figure 21:
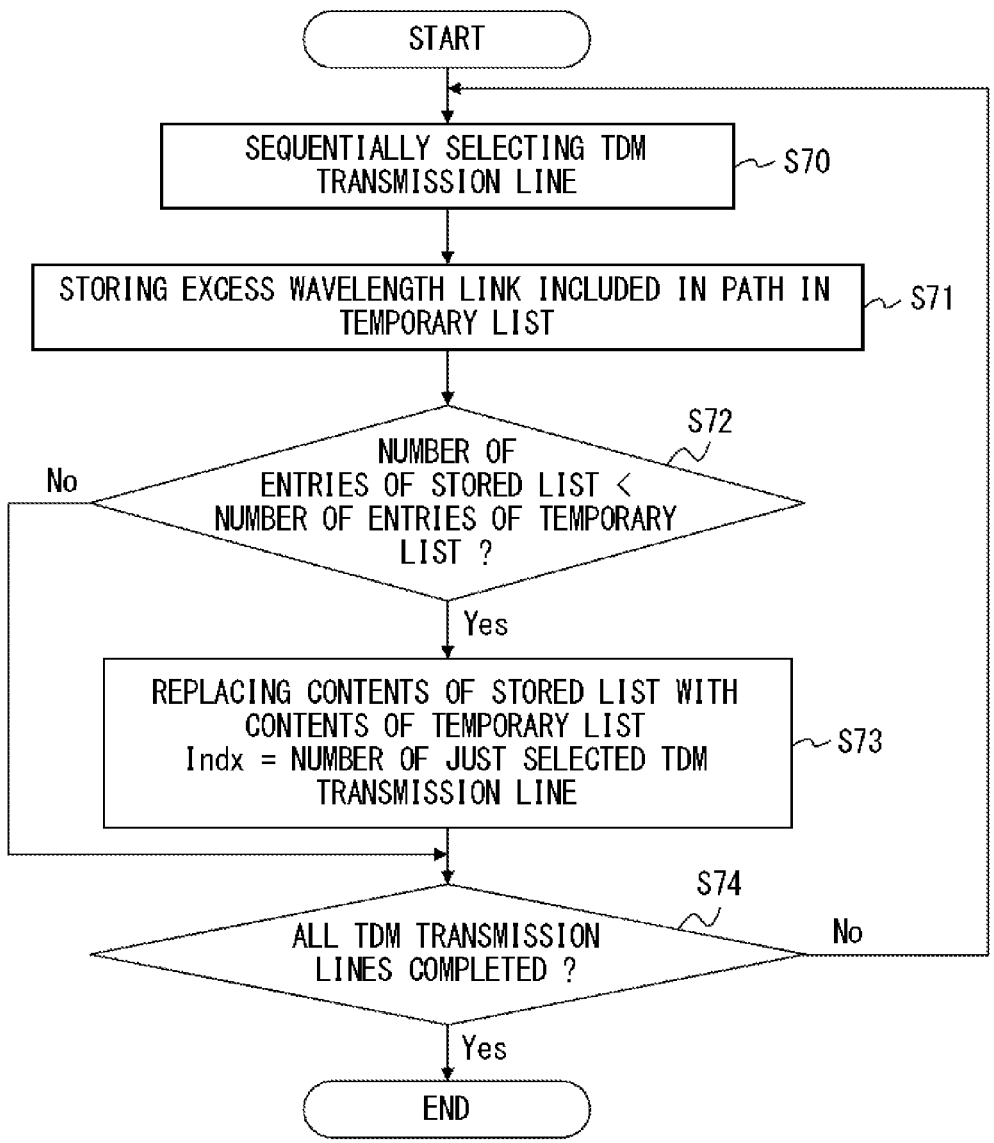
FIG. 21 is an explanatory view (15) of the first configuration example of an embodiment of the present invention.

Next, according to the present embodiment, a TDM transmission line is selected (step S26 in FIG. 7). The selection of a TDM transmission line is performed by selecting the TDM transmission line including the largest number of links in the excess wavelength link list on the path of the TDM transmission lines. FIG. 21 is an example of a flowchart.

In FIG. 21, the TDM transmission line is sequentially retrieved (step S70). If the link included in the path is also included in the excess wavelength links, the link is put in the temporary list (step S71).

For example, the paths of the TDM transmission lines are retrieved in the order of the number of TDM transmission line. In the case illustrated in FIG. 12, the path information is the list of the passing nodes. Therefore, two adjacent nodes specify a link through which the TDM transmission line passes. When the retrieved link is compared with the contents of the excess wavelength link list in FIG. 20, the link N1-N2 is put in the excess wavelength link list. Therefore, the link N1-N2 is put in the temporary list. Next, the stored list is compared with the number of entries of the temporary list (step S72). Since the stored list is at first empty, the number of entries is 0. On the other hand, since the temporary list includes one entry of the link N1-N2, the number of entries is 1. Accordingly, since the number of entries is larger in the temporary list, the contents of the stored list are replaced with the contents of the temporary list (step S73). That is, the contents of the stored list are {N1-N2}. In this case, the number of the TDM transmission line etc. is stored in the memory so that the link in the stored list may be clearly associated with its TDM transmission line. For example, in the flowchart in FIG. 21, it is stored in the variable Indx. The memory is rewritten when it is replaced with the stored list. Next, when the TDM transmission line 2 is retrieved and similarly processed, the temporary list stores the link N2-N3. In this case, the number of entries of the stored list is 1, and the number of entries of the temporary list is also 1. Therefore, the stored list remains as is. Similarly with the TDM transmission line 3, the stored list remains as is. Next, in the case of the TDM transmission line 4, the path is N1, N2, and N3, two links N1-N2 and N2-N3 are used, and they are put in the excess wavelength link list. Therefore, the links N1-N2 and N2-N3 are put in the temporary list. In this case, the number of entries of the stored list is 1, and the number of entries of the temporary list is 2. Accordingly, the contents of the stored list are replaced with the contents of the temporary list, that is, {N1-N2, N2-N3}. Similarly, in the case of the TDM transmission line 6, the paths N1, N2, N3, N4, and N5 pass through four links N1-N2, N2-N3, N3-N4, and N4-N5. Among them, the three links N1-N2, N2-N3, and N4-N5 are detected in the excess wavelength link list. Therefore, the links N1-N2, N2-N3, and N4-N5 are put in the temporary list. Therefore, since the number of entries of the stored list is 2 and the number of entries of the temporary list is 3, the stored list describes {N1-N2, N2-N3, N4-N5}. Then, in step S74, it is determined whether or not the process has been completed on all TDM transmission lines. If not, control is returned to step S70 and the processes are repeated. When all TDM transmission lines are completely checked, the stored list includes the excess wavelength link of the TDM transmission line having the largest number of excess wavelength links, and the memory stores the number of the TDM transmission line. The TDM transmission line remaining in the memory is the selected TDM transmission line. In this case, it is the TDM transmission line 6.

Next, in FIG. 7, the first link is selected (step S27). The first link is to have the number of TDM transmission lines exceeding the number of wavelengths available in the link by the largest number in the link in the stored list.

FIG. 22 is the flowchart of selecting the first link. In step S80, the variable maxLink stores the first link of the stored list. Next, the links are sequentially retrieved from the stored list (step S81), and compare the number of excess wavelengths of the link stored in the variable maxLink with the number of excess wavelengths of the retrieved link (step S82), and the larger number is stored in the maxLink (step S83). The process is performed on all links (step S84).

The number of excess wavelengths is 1 obtained as the number of TDM transmission lines exceeding the number of available wavelengths in the case of, for example, N1-N2 when the number of TDM transmission lines of the N1-N2 is 10 from the stored list and FIG. 19, and the number of available wavelengths is 9 with reference to FIG. 10. Similarly with the link N2-N3, the number of excess wavelengths is 1, and with the link N4-N5, the number of excess wavelengths is 2. Among them, since the largest number of excess wavelengths is detected in the link N4-N5, the link N4-N5 is selected as the first link.

Next, the second link is selected (step S28 in FIG. 7). The second link is to be the farthest from the first link in the links included in the stored list.

Figure 23:
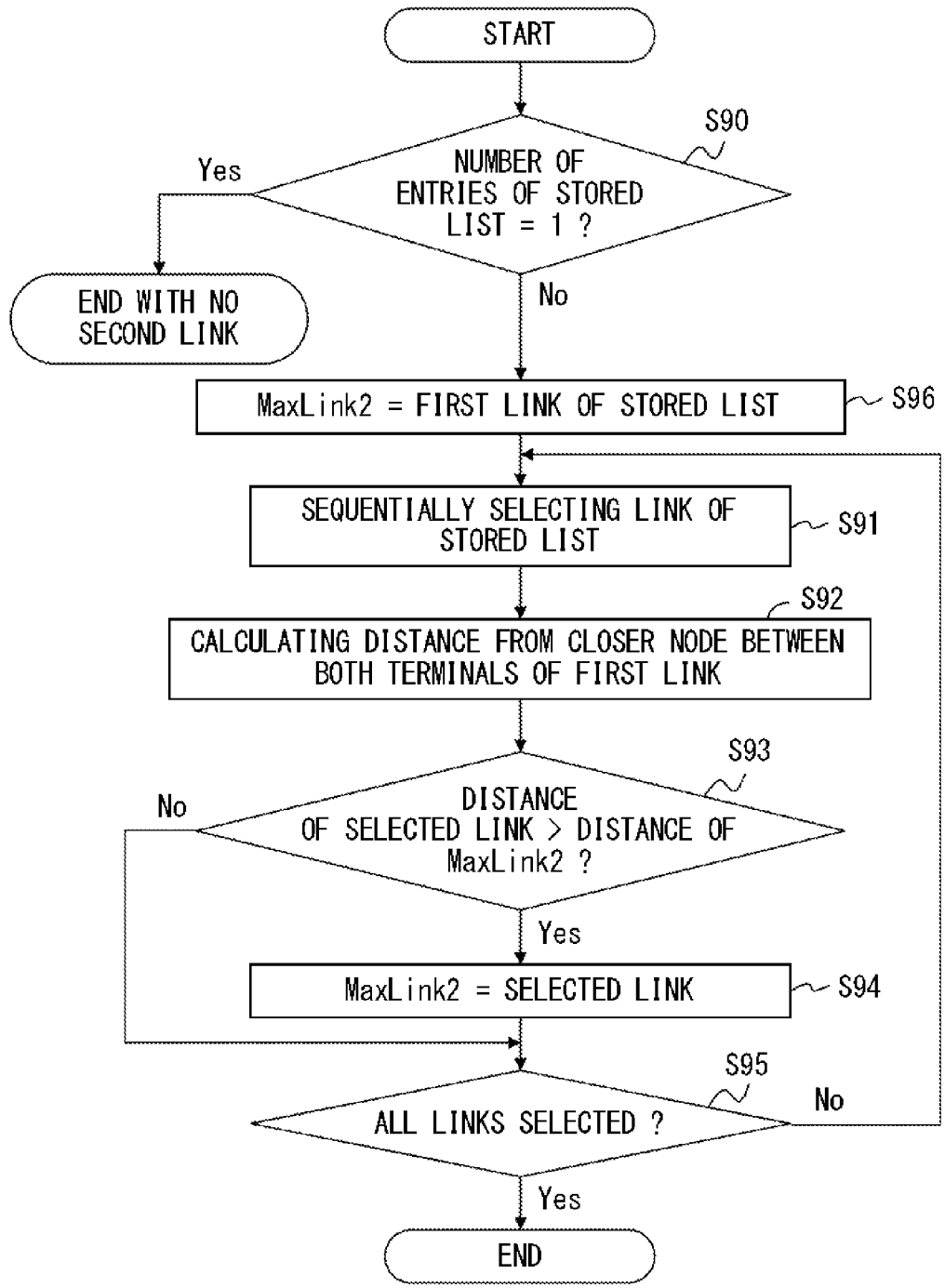
FIG. 23 is an explanatory view (17) of the first configuration example of an embodiment of the present invention.

FIG. 23 illustrates the flowchart of selecting the second link. The path used when the distance is calculated is that of the TDM transmission line selected in selecting the TDM transmission line (step S26 in FIG. 7). The distance between the links is that from the node closer to the link to be processed in both nodes in the first link to the node closer to the first link in both end nodes. In this example, the distance is a fiber length. The flowchart refers to sequentially retrieve the links in the stored list, and put the link having a longer distance from the first link in the variable maxLink 2. However, when the number of entries of the stored list is 1, that is, when there is only one excess wavelength link, the second link is not selected, thereby terminating the process without the second link. In step S90 it is determined whether or not the number of entries of the stored list is 1. If YES, the process terminates without the second link. If NO, maxLink 2 stores the first link of the stored list in step S96. For example, in maxLink 2, the link N1-N2 is first set. In step S91, the next link in the stored list is sequentially selected (for example, the link N2-N3 is selected), and in step S92, the distance from the node closer to both ends of the first link is calculated. In step S93, it is determined whether or not the distance of the selected link is longer than the distance of the link stored in the maxLink 2. If the determination in step S93 is NO, control is passed to step S95. If the determination in step S93 is YES, the selected link is stored in maxLink 2, and control is passed to step S95. It is determined whether or not all links have been selected. If NO, control is returned to step S91. If YES, the process terminates.

The stored list includes the links N1-N2 and N2-N3. For example, in the case of the link N1-N2, the distance between the node N4 which is closer to the link N1-N2 than the node N5 and the node N2 which is closer to the link N4-N5 than the node N1 is 10 km from FIG. 10. Similarly, in the case of the link N2-N3, the distance is 4 km. Among the two above, the longer distance is selected as the second link. In this case, the link N1-N2 is selected as the second link.

Next, relating to the selected first and second links, a new number of available wavelengths is determined (step S29 in FIG. 7). The new number of wavelengths is defined by the value obtained by subtracting the number of excess wavelengths from the original number of available wavelengths. For example, in the case of the first link N4-N5, the original number of available wavelengths is 9 and the number of excess wavelengths is 2. Therefore, the new number of available wavelengths is 7. Similarly, in the case of the second link N1-N2, the number is 8.

Next, the excess wavelength link is deleted (step S30 in FIG. 7). In this example, the link in the stored list is deleted from the excess wavelength link list. Therefore, the links N1-N2, N2-N3, and N4-N5 are deleted. In step S31 in FIG. 7, it is determined whether or not the excess wavelength link list is empty. Since the link N6-N3 remains in the excess wavelength link list when the links are deleted, the above-mentioned processes (steps S26 through S30 in FIG. 7) are repeated. In this case, there is only one excess wavelength link. Therefore, the second link is not selected. Accordingly, only the first link is selected, and a new number of available wavelengths is obtained only for the first link. In this case, the first link is the link N6-N3, and the new number of available wavelengths is 8.

When the link N6-N3 is deleted from the excess wavelength link list, the excess wavelength link list becomes empty. Therefore, the list of the links in FIG. 10 is replaced with a list including the new number of available wavelengths, based on which the redesigning process is performed. FIG. 24 is the list of new links. In FIG. 24, the bold and underlined number refers to the portion provided with the new number of available wavelengths.

Next, the redesigning process is performed (control is returned to step S21 in FIG. 7, and the processes in steps S21 through S24 are performed). In the redesigning process, the process is not performed all through the TDM transmission line of capacity of 8. Therefore, the TDM transmission line of capacity of 32 is used anywhere, and the smallest number of TDM transmission lines of capacity of 32 is the minimum cost solution.

First, when the TDM transmission line of capacity of 32 is applied for accommodation of a demand which passes through each of the links N1-N2 and N4-N5, there are the method for application to the demands for N1-N2 and N4-N5, the method for application to the demands for N1-N3 and N4-N5, and the method for application to the demand for N1-N5. Since the demand for N1-N2 has the bandwidth of 6 and the number is 5, one TDM transmission line of capacity of 32 may accommodate all demands. Since the demand for N4-N5 has the bandwidth of 6 and the number is 8, one TDM transmission line of capacity of 32 and three TDM transmission lines of capacity 8 may accommodate all demands. In the case of the demand for N1-N5, the bandwidth of 4 and the number of 6 require one TDM transmission line of capacity of 32 to accommodate all demands. Among them, the smallest number of TDM transmission lines of capacity of 32 refers to the application to the demand for N1-N5. Therefore, the solution is selected (since the TDM transmission line of capacity of 32 requires more cost by the larger number of lines, the smallest number of TDM transmission lines is selected for the lowest cost).

For the link N6-N3, the TDM transmission line of capacity of 32 may be applied to the accommodation of the demand for N6-N3 and may be applied to the accommodation of the demand for N6-N7. Since the demand for N6-N7 has the bandwidth of 6 and the number of 5, one TDM transmission line of capacity of 32 accommodates all demands. On the other hand, since the demand for N6-N7 has the bandwidth of 4 and the number of 10, one TDM transmission line of capacity of 32 and one TDM transmission line of capacity of 8 are required. when the calculation is made from the total bandwidth (when the calculation is made by ignoring that a demand is not divided from the total bandwidth of the demands to be accommodated in the link in FIG. 11), and when the application is made to the link N6-N3, one TDM transmission line of a total capacity of 32 or five TDM transmission lines of capacity of 8 are required. When the application is made to the link N6-N7, one TDM transmission line of capacity of 32 or five TDM transmission lines of capacity of 8 are required. The breakdown of the number of TDM transmission lines of capacity of 8 is four because the calculation is made from the total bandwidth of the link N6-N3, and one to accommodate what is not accommodated in the TDM transmission line of capacity of 32 of the link N6-N7. Since they require the equal cost, the result depends on the implementation, but the application is made to the link N6-N3 in this example.

FIG. 25 illustrates the number of TDM transmission lines as a result of design after determining the demand to be accommodated in each TDM transmission line. FIG. 26 illustrates the number of TDM transmission lines for each link. In FIG. 26, the bold underlined number indicates the number of TDM transmission lines exceeds the number of wavelengths available in the link in the first designing process. Thus, a result of design of the lowest cost may be obtained while satisfying the restriction of the number of wavelengths available in the link.

FIG. 27 is an example of a flowchart of selecting the second link in the second configuration example.

In FIG. 27, the same step as in FIG. 23 is assigned the same step number, and the explanation is omitted here.

The difference from the flowchart of selecting the second link in the first configuration example illustrated in FIG. 23 is that the hop count (number of links) from the first link is used instead of the distance from the first link (step S100, S101). The hop count refers to the number of links between the node closer to the second link in both end nodes of the first link and the node closer to the first link in the both end nodes of the second link. For example, assume that the TDM transmission line 6 (FIG. 12) is selected as a TDM transmission line. When the link N4-N5 is selected as the first link, for example, the hop count between the link N1-N2 and the link N4-N5 is the number of links between the nodes N2 and N4. In this case, since there are two links N2-N3 and N3-N4, the hop count is 2. The operations on other portions are the same as the first configuration example.

In the second configuration example according to the present embodiment, when the second link i selected, the link which has the largest hop count from the previously selected first link, which is located on the path of the selected TDM transmission line, and which has the number of TDM transmission lines exceeding the number of wavelengths available in the link is selected as the second link. A result of the designing process may be obtained with the least possible portions in which a TDM transmission line of a larger capacity is used.

Thus, although a very long (a high hop count) link is included on the path of the TDM transmission line, a result of the designing process may be obtained with the least possible portions in which a TDM transmission line of a larger capacity is used.

Figure 28:
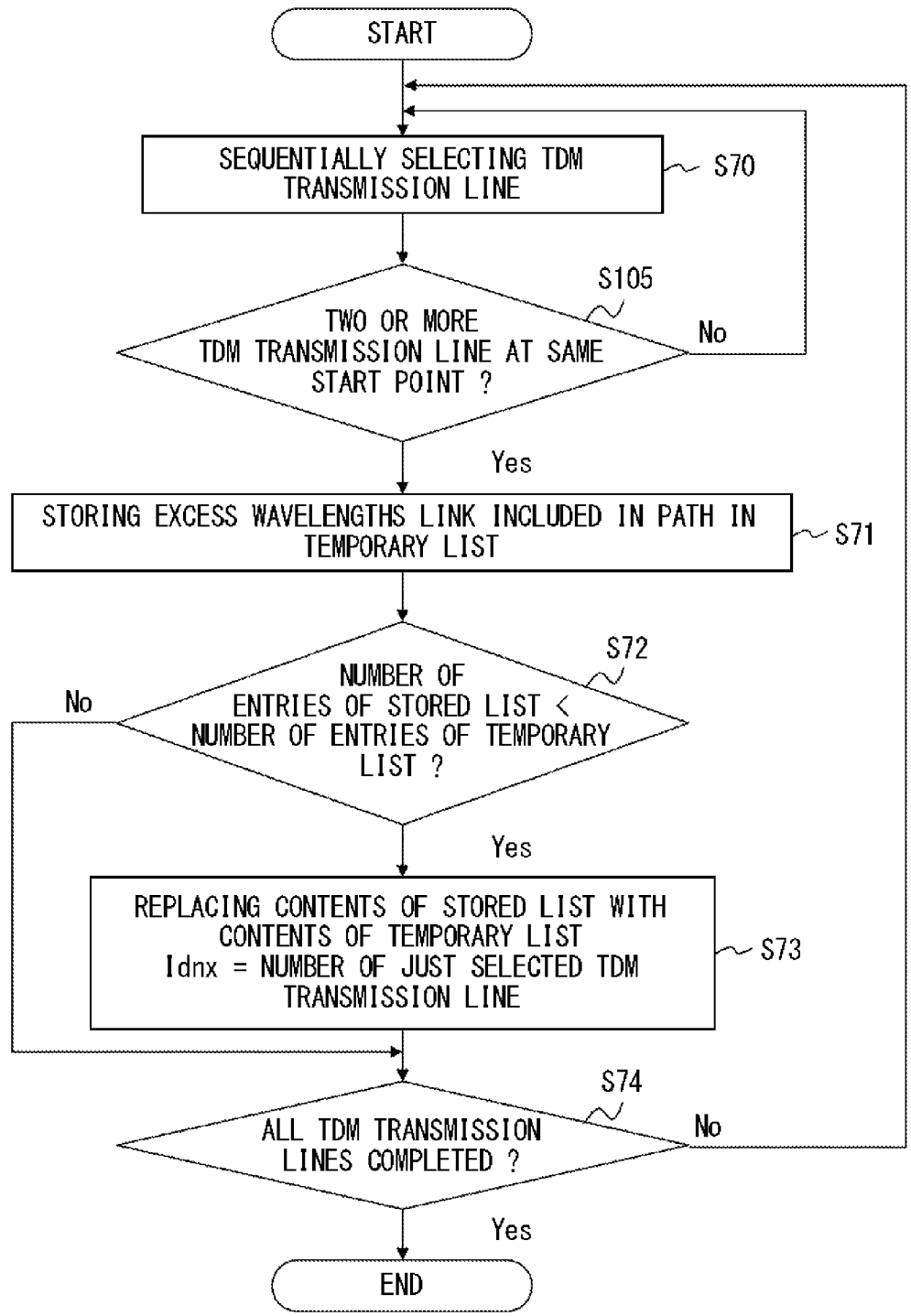
FIG. 28 is an example of the flowchart of selecting a TDM transmission line in the third configuration example.

FIG. 28 is an example of a flowchart of selecting a TDM transmission line in the third configuration example.

In FIG. 28, the same step as in FIG. 21 is assigned the same step number, and the explanation is omitted here.

When the TDM transmission line is sequentially retrieved, the number of TDM transmission lines is not reduced although a TDM transmission line of a larger capacity is applied unless there are two or more TDM transmission lines having the same start and end points. Therefore, unlike the process of selecting the TDM transmission line in the first configuration example, it is checked whether or not there are two or more TDM transmission lines having the same start and end points (step S105). If there is only one, the next TDM transmission line is to be retrieved. The process performed when there are two or more TDM transmission lines having the same start and end points is the same as the process in the first configuration example. The steps other than the step of selecting the TDM transmission line are the same as those in the first configuration example.

In the third configuration example, when a TDM transmission line is selected, a TDM transmission line which includes the largest number of links in which the number of TDM transmission lines exceeds the number of wavelengths available in the link, and has two or more TDM transmission lines in the same section is selected. Thus, a result of the designing process may be obtained with the least possible portions in which a TDM transmission line of a larger capacity is used.

Although TDM transmission lines which do not reduce the number of TDM transmission lines by applying a TDM transmission line of a larger capacity coexist, a result of the designing process may be obtained with the least possible portions in which a TDM transmission line of a larger capacity is used.

Figure 29:
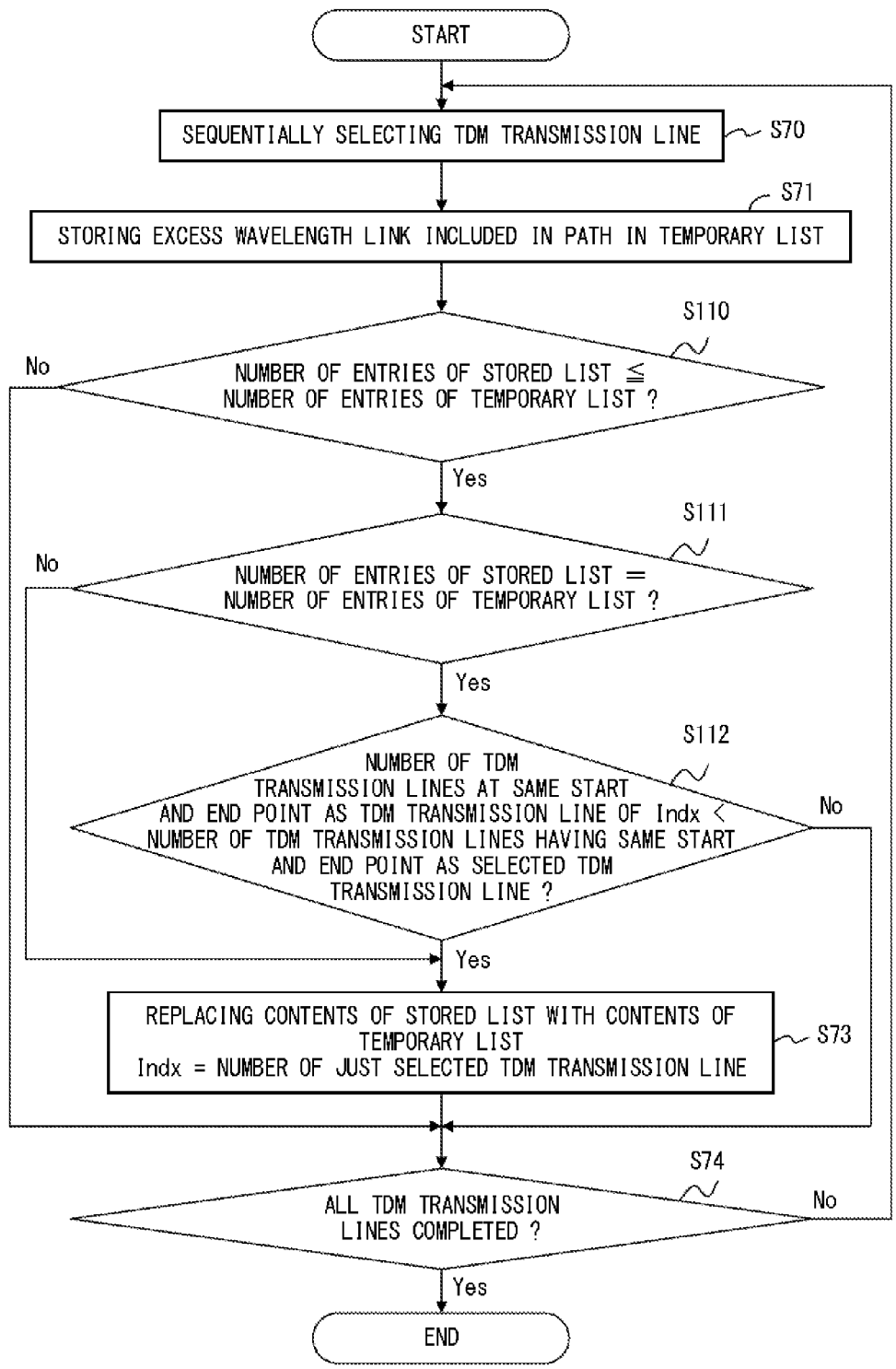
FIG. 29 is an example of the flowchart of selecting a TDM transmission line in the fourth configuration example.

FIG. 29 is an example of the flowchart of selecting a TDM transmission line in an example the fourth configuration.

In FIG. 29, the same step as in FIG. 21 is assigned the same step number, and the explanation is omitted here.

The difference from the process of selecting a TDM transmission line in the first configuration example is that when there are a plurality of TDM transmission lines which include the largest number of links in the excess wavelength link list, the TDM transmission line which includes the largest number of TDM transmission lines having the same start and end points is selected. In this method, it is expected that a unused portion of the TDM transmission line may be minimized when a TDM transmission line of a larger capacity is used if there are a larger number of TDM transmission lines having the same start and end points. In the flowchart, the processes in steps S70 and S71 are performed first. Then, the number of entries of the temporary list is compared with those of the stored list, and when the number of entries of the temporary list is larger than or equal to the number of entries of the stored list (step S111), it is further checked whether or not the number of entries of the temporary list is equal to the number of entries of the stored list (step S110). If they are equal to each other, the number of TDM transmission lines having the same start and end points as the selected TDM transmission line is compared with the number of TDM transmission lines having the same start and end points as the TDM transmission line in Indx (step S112). If the former is larger, the stored list is updated. Otherwise, the stored list is not updated. The operation performed when the number of entries of the temporary list is not equal to the number of entries of the stored list is the same as in the first configuration example. The portions other than the process of selecting the TDM transmission line are the same as those in the first configuration example.

The numbers of entries are compared between the stored list and the temporary list (step S110). Since the stored list is first empty, the number of entries is 0. On the other hand, since the temporary list includes one entry of the link N1-N2, the number of entries is 1. Accordingly, since the number of entries is larger in the temporary list, control is passed to step S111. In step S111, it is determined whether or not the number of entries of the stored list is equal to the number of entries of the temporary list. In this case, they are not equal. Therefore, the contents of the stored list are replaced with the contents of the temporary list (step S73). That is, the contents of the stored list are {N1-N2}. In this case, the number of the TDM transmission line etc. is stored in the memory so that the link in the stored list may be clearly associated with its TDM transmission line. For example, in the flowchart in FIG. 21, it is stored in the variable Indx. The memory is rewritten when it is replaced with the stored list. Next, when the TDM transmission line 2 is retrieved and similarly processed, the temporary list stores the link N2-N3. In this case, the number of entries of the stored list is 1, and the number of entries of the temporary list is also 1. Therefore, in step S112, it is determined whether or not the number of TDM transmission lines having the same start and end points as the TDM transmission line of Indx exceeds the number of TDM transmission lines having the same start and end points as the selected TDM transmission line. If the determination in step S112 is NO, control is passed to step S74, and the stored list remains as is. If the determination in step S112 is YES, the contents of the stored list are replaced with those of the temporary list, and the Indx is set with the number of the just selected TDM transmission line. Similarly with the TDM transmission line 3, the stored list remains as is. Next, in the case of the TDM transmission line 4, the path is N1, N2, and N3, two links N1-N2 and N2-N3 are used, and they are put in the excess wavelength link list. Therefore, the links N1-N2 and N2-N3 are put in the temporary list. In this case, the number of entries of the stored list is 1, and the number of entries of the temporary list is 2. Accordingly, in step S73, the contents of the stored list are replaced with the contents of the temporary list, that is, {N1-N2, N2-N3}. Similarly, in the case of the TDM transmission line 6, the paths N1, N2, N3, N4, and N5 pass through four links N1-N2, N2-N3, N3-N4, and N4-N5. Among them, the three links N-N2, N2-N3, and N4-N5 are detected in the excess wavelength link list. Therefore, the links N1-N2, N2-N3, and N4-N5 are put in the temporary list. Therefore, since the number of entries of the stored list is 2 and the number of entries of the temporary list is 3, the stored list describes {N1-N2, N2-N3, N4-N5}. Then, in step S74, it is determined whether or not the process has been completed on all TDM transmission lines. If not, control is returned to step S70 and the processes are repeated. When all TDM transmission lines are completely checked, the stored list includes the excess wavelength link of the TDM transmission line having the largest number of excess wavelength links, and the memory stores the number of the TDM transmission line. The TDM transmission line remaining in the memory is the selected TDM transmission line. In this case, it is the TDM transmission line 6.

In the third configuration example, when a TDM transmission line is selected, a TDM transmission line which includes the largest number of links in which the number of TDM transmission lines exceeds the number of wavelengths available in the link, and has the largest number of TDM transmission lines in the same section (same start and end points) is selected. Thus, a result of the designing process may be obtained with the least possible portions in which a TDM transmission line of a larger capacity is used.

By applying a TDM transmission line of a larger capacity, the TDM transmission line with which the number of TDM transmission lines may be reduced without fail is selected. Therefore, a result of the designing process may be obtained more correctly and at a lower processing frequency with the least possible portions in which a TDM transmission line of a larger capacity is used.

Figure 30:
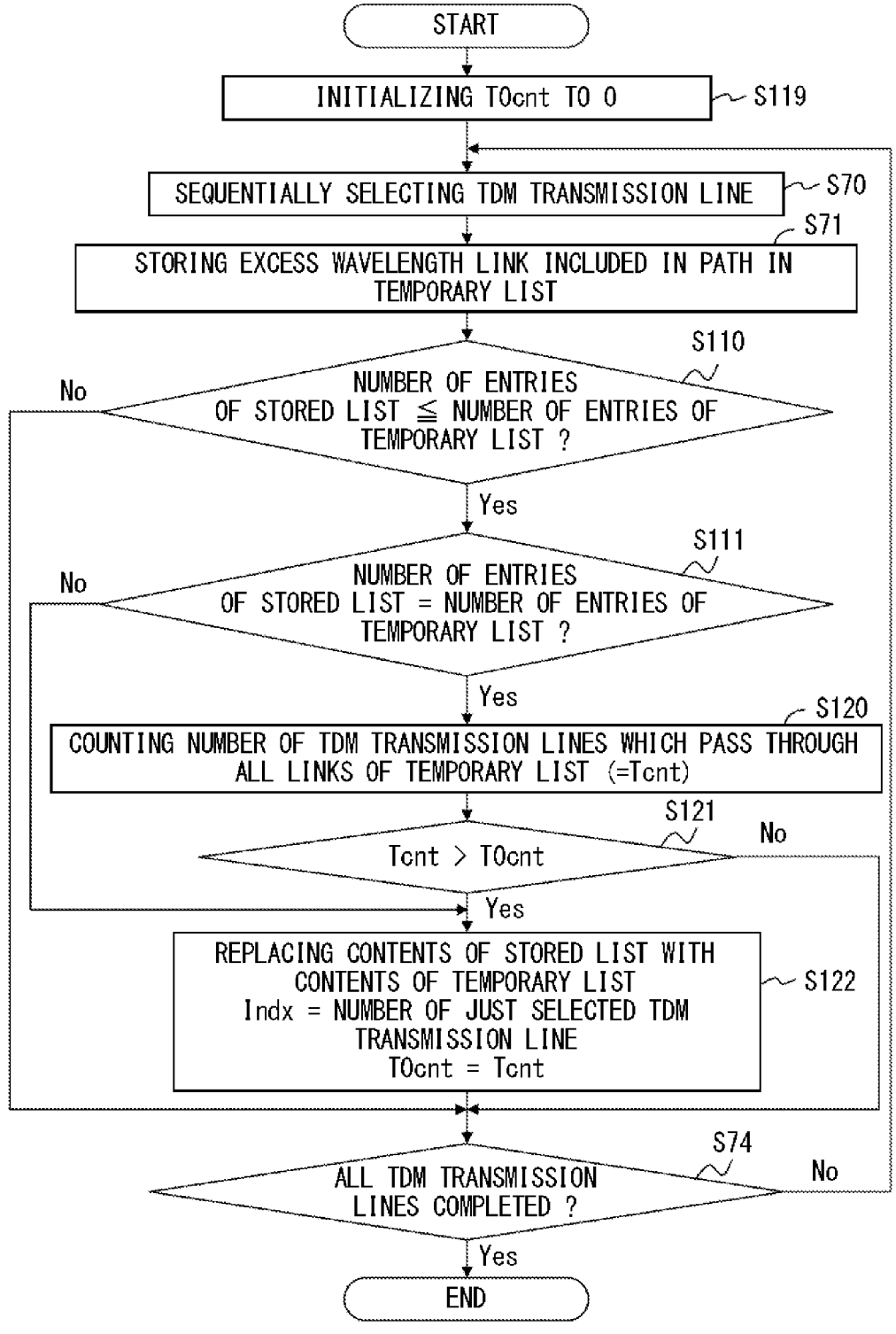
FIG. 30 is an example of the flowchart of selecting a TDM transmission line in the fifth configuration example.

In the fifth configuration example, the process of selecting the TDM transmission line is different from the process in the first configuration example. FIG. 30 is an example of the flowchart of selecting a TDM transmission line in an example the fifth configuration.

In FIG. 30, the same step as in FIG. 29 is assigned the same step number, and the explanation is omitted here.

The difference from the process of selecting a TDM transmission line in the first configuration example is that when there are a plurality of TDM transmission lines which include the largest number of links in the excess wavelength link list, the TDM transmission line which has the largest number of TDM transmission lines passing through all links in the temporary list is selected. For example, in the case of the topology in FIG. 8, as the TDM transmission line which passes through the link N1-N2, the TDM transmission line from N1 to N3 also passes through the link N1-N2 in addition to the TDM transmission line from N1 to N2. For example, if the link N1-N2 is an excess wavelength link, a TDM transmission line of a larger capacity is applied to a TDM transmission line from N1 to N2, and a demand originally accommodated in the TDM transmission line from N1 to N3 is accommodated together. Then, for the link N1-N2, the TDM transmission line from N1 to N2 and the TDM transmission line from N1 to N3 are accommodated in the TDM transmission line of a larger capacity, thereby largely reducing the number of TDM transmission lines of the link N1-N2. In this case, a TDM transmission line is newly provided from N2 to N3, and the demand from N1 to N3 is accommodated using the TDM transmission line from N1 to N2 in the section from N1 to N2, and using the TDM transmission line from N2 to N3 in the section from N2 to N3. In the node N2, a connection is made using a switch and a cross-connect device.

In FIG. 30, the variable T0cnt is initialized to 0. Then, the processes in steps S70 and S71 are performed. Then, the numbers of entries are compared between the temporary list and the stored list. When the number of entries of the temporary list is equal to or exceeds the number of entries of the stored list (step S110), it is further checked whether or not the number of entries of the temporary list is equal to the number of entries of the stored list (step S111). If they are equal to each other, the number of TDM transmission lines which pass through all links in the temporary list is put in the variable Tcnt (step S120). The TDM transmission lines are sequentially retrieved, and it is checked whether or not the links included in the temporary list are all contained in the links included in the path. If the links are all contained, then the number of TDM transmission lines is to be accumulated. The number of TDM transmission lines includes the number of currently selected TDM transmission lines. Next, the number of TDM transmission lines is compared with the variable T0cnt (step S121). If the Tcnt is larger, the stored list is updated and the equation T0cnt=Tcnt holds (step S122). Therefore, T0cnt includes a total number of TDM transmission lines which pass through all links included in the stored list. The operation performed when the number of entries of the temporary list is not equal to the number of entries of the stored list is the same as in the first configuration example. The portions other than the process of selecting the TDM transmission line are the same as those in the first configuration example.

In the fifth configuration example, when a TDM transmission line is selected, a TDM transmission line which includes the largest number of links in which the number of TDM transmission lines exceeds the number of wavelengths available in the link, and has the largest number of TDM transmission lines which pass through all links in which the number of TDM transmission lines exceed the number of wavelengths available in the link included in the TDM transmission line is selected. Thus, a result of the designing process may be obtained with the least possible portions in which a TDM transmission line of a larger capacity is used.

By applying a TDM transmission line of a larger capacity, the TDM transmission line with which the number of TDM transmission lines may be reduced without fail is selected. Therefore, a result of the designing process may be obtained more correctly and at a lower processing frequency with the least possible portions in which a TDM transmission line of a larger capacity is used.

In the sixth configuration example, the process of selecting a TDM transmission line is different from the process in the first configuration example. FIG. 31 is an example of the flowchart of selecting a TDM transmission line in the sixth configuration example.

In FIG. 31, the same step as in FIG. 30 is assigned the same step number, and the explanation is omitted here.

The difference from the process of selecting a TDM transmission line in the first configuration example is that when there are a plurality of TDM transmission lines which includes the largest number of links in the excess wavelength link list, the TDM transmission line having the largest number of TDM transmission lines which pass through all links included in the temporary list and any of whose terminal points match the start point of the currently selected TDM transmission line or any of whose terminal points match the end point of the currently selected TDM transmission line is selected.

In the flowchart in FIG. 31, first in step S124, the variables Thcnt, Ttcnt, and Tcnt2 are initialized to 0. Then, the processes in steps S70 and S71 are performed. Then, the numbers of entries are compared between the temporary list and the stored list. When the number of entries of the temporary list is equal to or exceeds the number of entries of the stored list (step S110), it is further checked whether or not the number of entries of the temporary list is equal to the number of entries of the stored list (step S111). If they are equal to each other, the number of TDM transmission lines which pass through all links in the temporary list and any of whose terminal points match the start point of the currently selected TDM transmission line is counted and put in Thcnt (step S125). Next, the number of TDM transmission lines which pass through all links in the temporary list and any of whose terminal points match the end point of the currently selected TDM transmission line is counted and put in Ttcnt (step S126). Then, whichever larger between Thcnt and Ttcnt is put in Tcnt2 (steps S127, S128, and S129). In the example in FIG. 31, if Thcnt is equal to Ttcnt, then Tcnt2 is set to Thcnt. Tcnt2 is compared with T0cnt2 (step S130). When Tcnt2 is larger, the contents of the stored list are exchanged for the contents of the temporary list, Indx is the number of the currently selected TDM transmission line, thereby T0cnt2=Tcnt2. The operation performed when the number of entries of the temporary list is not equal to the number of entries of the stored list is the same as in the first configuration example. The portions other than the process of selecting a TDM transmission line are the same as in the first configuration example.

In the sixth configuration example according to the present embodiment, when a TDM transmission line is selected, the TDM transmission line which includes the largest number of link in which the number of TDM transmission lines exceeding the number of wavelengths available in the link, pass through all links in which the number of TDM transmission lines exceeds the number of wavelengths available in the link included in the TDM transmission line, and has the largest total number of TDM transmission lines matching the start or end point of the selected TDM transmission line is selected. Thus, a result of the designing process may be obtained with the least possible portions in which TDM transmission line of a larger capacity is used.

By applying a TDM transmission line of a larger capacity, the TDM transmission line with which the number of TDM transmission lines may be reduced without fail is selected. Therefore, a result of the designing process may be obtained more correctly and at a lower processing frequency with the least possible portions in which a TDM transmission line of a larger capacity is used.

Figure 32:
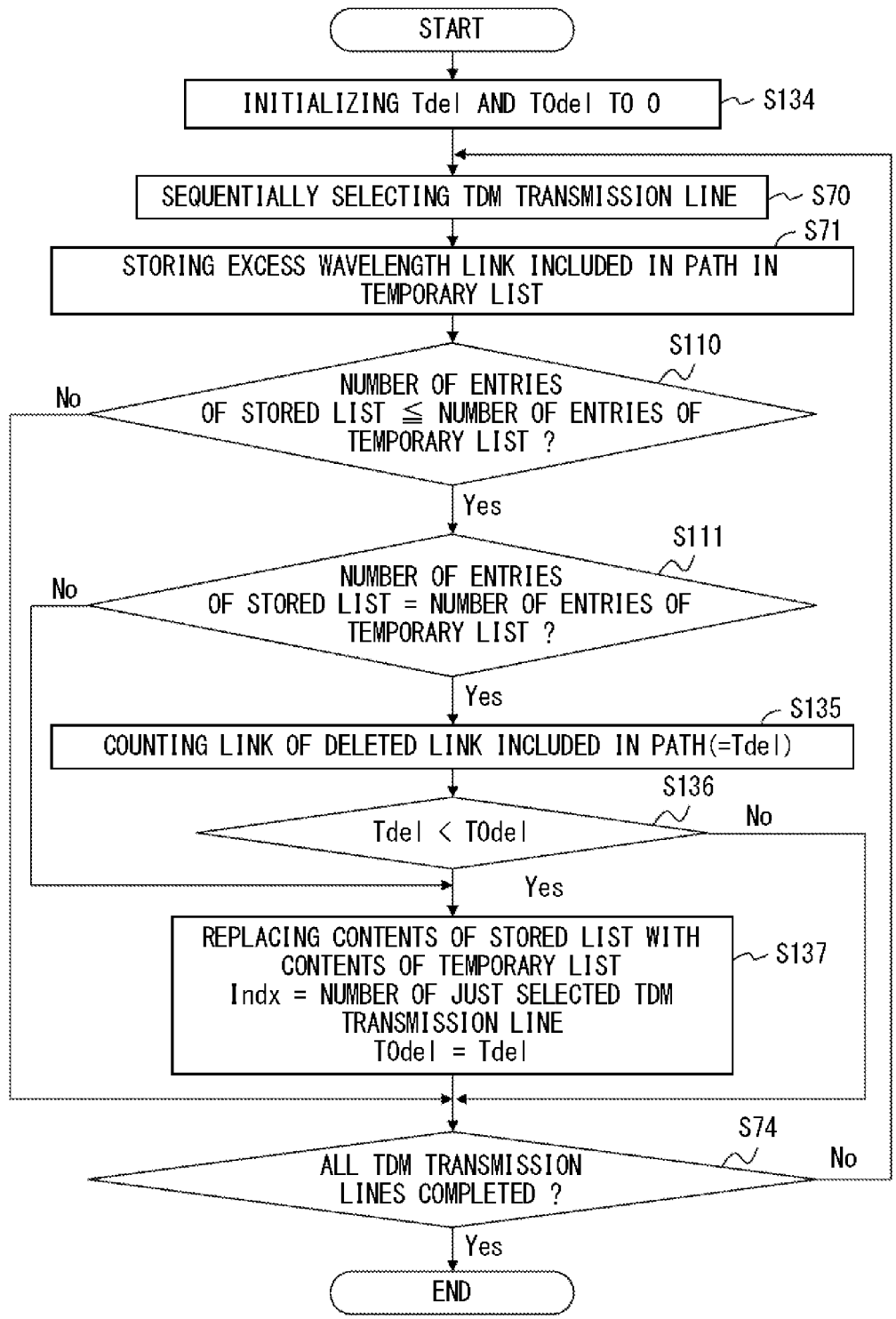
FIG. 32 is an example of the flowchart of selecting a TDM transmission line in the seventh configuration example.
Figure 33:
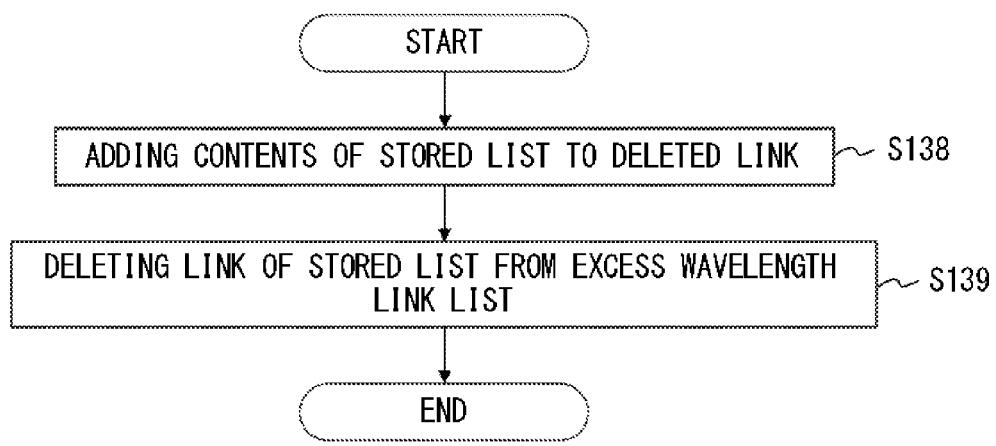
FIG. 33 is an example of the flowchart of the portion in which a link including an excess wavelength link is deleted.

The seventh configuration example is different from the first configuration example in the process of selecting a TDM transmission line and the process of deleting a excess wavelength link. FIG. 32 is an example of the flowchart of selecting a TDM transmission line in the seventh configuration example. FIG. 33 is an example of the flowchart of the portion in which a link including an excess wavelength link is deleted.

In FIG. 32, the same step as in FIG. 31 is assigned the same step number, and the explanation is omitted here.

First, in FIG. 33, the differences from the portion of deleting the excess wavelength link in the first configuration example are the procedure of deleting the link in the stored list from the excess wavelength link list (step S139) and the procedure of adding the link in the stored list to the deletion list (step S138). There is no order rule between the two procedures, and the order reverse to FIG. 33 is available.

The deletion list stores the links deleted from the excess wavelength link list in the links first stored in the excess wavelength link list. The difference in selecting a TDM transmission line is that when there are a plurality of TDM transmission lines including the largest number of links in the excess wavelength link list, the TDM transmission line which is included in the path of the TDM transmission line and has the smallest number of links in the deletion list is selected.

In the flowchart in FIG. 32, Tde1 and T0del is initialized to 0 first in step S134. Then, the processes in steps S70 and S71 are performed. Then, the number of entries is compared between the temporary list and the stored list. If the number of entries of the temporary list is equal to or exceeds the number of entries of the stored list (step S110), it is further checked whether or not the number of entries of the temporary list is equal to the number of entries of the stored list (step S111). If they are equal to each other, the number of links in the deletion list is counted in the links included in the path of the currently selected TDM transmission line, and is put in Tde1 (step S135). Next, Tde1 is compared with T0del (step S136). If Tde1 is smaller, the contents of the stored list are exchanged for the contents of the temporary list, thereby T0del=Tde1 (step S137). The operation performed when the number of entries of the temporary list is not equal to the number of entries of the stored list is the same as in the first configuration example. The process of selecting a TDM transmission line and the processes other than deleting a excess wavelength link are the same as in first configuration example.

In the seventh configuration example according to the present embodiment, when a TDM transmission line is selected, a TDM transmission line which includes the largest number of links in which the number of TDM transmission lines exceeds the number of wavelengths available in the link, and has the smallest number of links deleted from the list of links in which the number of TDM transmission lines exceeds the number of wavelengths available in the link is selected.

Thus, a result of the designing process may be obtained with the least possible portions in which a TDM transmission line of a larger capacity is used.

By applying a TDM transmission line of a larger capacity, the TDM transmission line with which the number of TDM transmission lines may be reduced without fail is selected. Therefore, a result of the designing process may be obtained more correctly and at a lower processing frequency with the least possible portions in which a TDM transmission line of a larger capacity is used.

The eighth configuration example is different from the first configuration example in the process of selecting the first and second links. FIG. 34 is an example of the flowchart of the portion in which the first and second links corresponding to an example of the eighth configuration are selected.

In the eighth configuration example, the first and second links are selected by the same portion, and the two links are simultaneously selected. The flowchart in FIG. 34 is to specifically illustrate the portion of selecting the first and second links illustrated in FIG. 7. In the flowchart in FIG. 34, the variables Lindx 1, Lindx 2, Tc012, Tc12 are initialized in step S144. Then, the links of the stored list are sequentially retrieved as the first link (step S145). Next, the second link is retrieved from the stored list excluding the first link (step S146). When the link in the stored list is assigned, for example, the number i as i=1, 2, . . . , n, the first link is sequentially retrieved in the order of i=1, 2, . . . , n−1. The second link may be retrieved in the order of j=i+1, i+2, . . . , n by assigning j as the number of the second link. Then, the number of sections of the TDM transmission line which includes both first and second links in the path is counted (step S147).

The section of the TDM transmission line refers to, for example, from N1 to N2 in FIG. 12, etc., and any number of TDM transmission lines from N1 to N2 are counted as one section. For example, the number of sections of the TDM transmission lines which pass through the link N1-N2 is three from N1 to N2, from N1 to N3, and from N1 to N5. However, only one or more TDM transmission line practically set in a section is to be counted. For example, the section from N3 to N5, the section from N3 to N7, etc. in FIG. 15 indicates the number of 0 of TDM transmission lines, Then, the number of counted sections is put in Tc 12. Then, it is compared with Tc012 (step S148). If Tc12 is smaller, the first link is put in Lindx 1, and the second link is put in Lindx 2, thereby Tc 012=Tc 12 (step S149). In step S150, it is determined whether or not the selection of the second link has been completed. In step S151, it is determined whether or not selection of the first link has been completed. If not, control is returned to steps S145 and S146 respectively, and the processes are repeated. By repeating the processes, a combination of links having the smallest number of sections of the TDM transmission line which passes through the two selected links is obtained from Lindx 1 and Lindx 2. The obtained link in the Lindx 1 is the first link, and the link in the Lindx 2 is the second link. The operations performed for other portions are the same as in the first configuration example.

In the eighth configuration example according to the present embodiment, when the first and second links are selected, two links which include the smallest number of pairs of start and end points of the TDM transmission lines which pass through the two links in the links which include the number of TDM transmission lines exceeding the number of wavelengths available in the links are selected as the first and second links. Thus, a result of the designing process may be obtained with the least possible portions in which a TDM transmission line of a larger capacity is used.

By selecting an appropriate link so that a TDM transmission line of a larger capacity may be applied to the longest possible TDM transmission line, a result of the designing process may be obtained more correctly and at a lower processing frequency with the least possible portions in which a TDM transmission line of a larger capacity is used.

Figure 35:
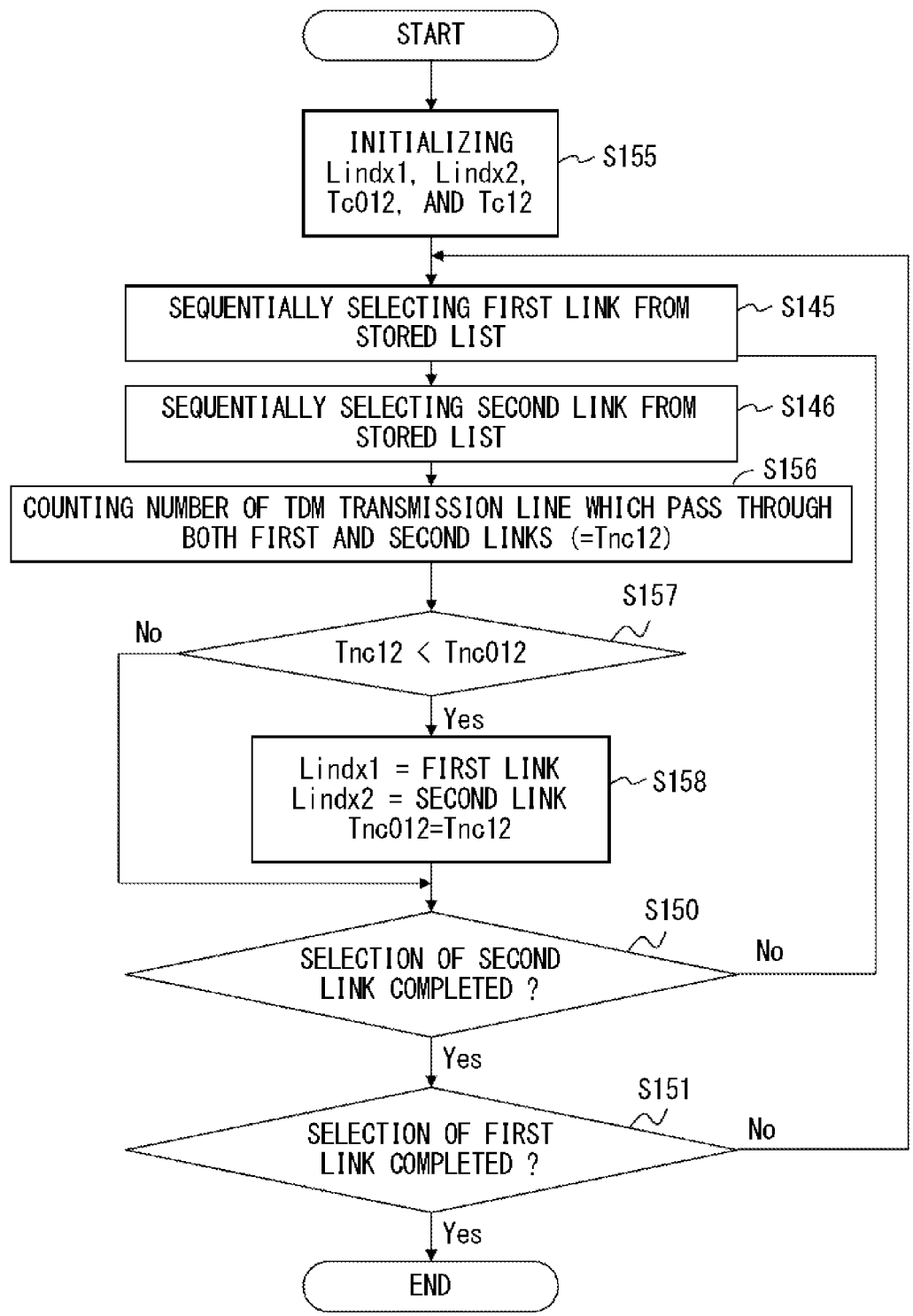
FIG. 35 is an example of the flowchart of the portion in which the first and second links corresponding to an example of the ninth configuration are selected.

The ninth configuration example is different from the first configuration example in the process of selecting the first and second links. FIG. 35 is an example of the flowchart of the portion in which the first and second links corresponding to an example of the ninth configuration are selected.

In FIG. 35, the same step as in FIG. 34 is assigned the same step number, and the explanation is omitted here.

The ninth configuration example is different from the eighth configuration example as follows. That is, in the eighth configuration example, the number of sections of the TDM transmission lines which pass through two selected links is counted. On the other hand, in the ninth configuration example, the number of TDM transmission lines which pass through the two selected links is counted. For example, the number of sections of the TDM transmission line in the case illustrated in FIG. 12 is a total of 9, but the number of TDM transmission lines in the case illustrated in FIG. 15 is a total of 28. The eighth configuration example takes a shorter processing time, but it is not certain whether or not the number of TDM transmission lines which pass through the two selected links is practically small. That is, a rough estimate is made in the eighth configuration example. On the other hand, in the ninth configuration example, it takes a longer processing time, but a smaller number of TDM transmission lines which pass through both links are obtained without fail.

In FIG. 35, in step S155, Lindx 1, Lindx 2, Tnc 012, and Tnc 12 are initialized. Then, in steps S145 and S146, after selecting the first and second links, the number of TDM transmission lines which commonly pass through the first and second links is counted and put in Tnc 12 (step S156). Tnc 12 is compared with Tnc 012 (step S157). If the Tnc 12 is smaller, then the first link is put in Lindx 1, and the second link is put in the lindx 2, thereby Tnc 012=Tnc 12 (step S158). The operations performed on other portions are the same as in the second configuration example.

In the ninth configuration example according to the present embodiment, when the first and second links are selected, two links which include the smallest total number of the TDM transmission lines which pass through the two links in the links which include the number of TDM transmission lines exceeding the number of wavelengths available in the links are selected as the first and second links. Thus, a result of the designing process may be obtained with the least possible portions in which a TDM transmission line of a larger capacity is used.

By selecting an appropriate link so that a TDM transmission line of a larger capacity may be applied to the longest possible TDM transmission line, a result of the designing process may be obtained more correctly and at a lower processing frequency with the least possible portions in which a TDM transmission line of a larger capacity is used.

Figure 36:
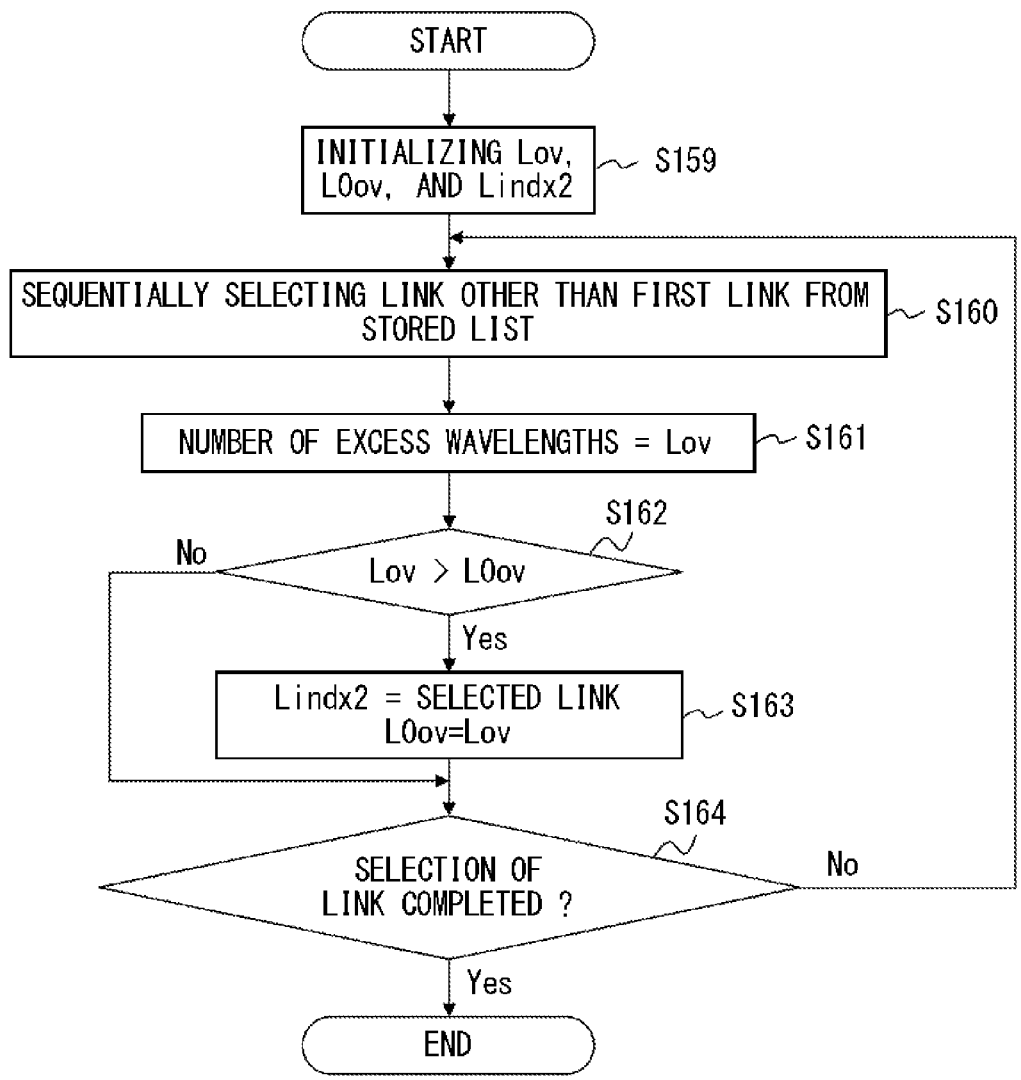
FIG. 36 is an example of the flowchart of the portion in which the second link corresponding to an example of the tenth configuration is selected.

The tenth configuration example is different from the first configuration example in the portion of selecting the second link. FIG. 36 is an example of the flowchart of the portion in which the second link corresponding to an example of the tenth configuration is selected.

The difference from the first configuration example is that the link having the number of TDM transmission lines, which pass through the link as the second link, exceeding the number of wavelengths available in the link by the largest number is selected as the second link.

In the flowchart in FIG. 36, in step S159, the variables Lov, L0ov, and Lindx 2 are initialized. Then, the links other than the first link are sequentially retrieved from the stored list (step S160), and the number of excess wavelengths is put in Lov (step S161). In this example, the number of excess wavelengths refers to the difference between the number of TDM transmission lines which pass through the link and the number of wavelengths available in the link. Then, Lov is compared with L0ov (step S162). If Lov is larger, Lindx 2 is updated, thereby L0ov=Lov (step S163). In step S164, it is determined whether or not the selection of a link has been completed. If not, control is returned to step S160, and the processes are repeated. When the process is repeated, the link having the largest number of excess wavelengths in the stored list is left in Lindx 2. The link remaining in the Lindx 2 is selected as the second link. The operation of other portions is the same as in the first configuration example.

In the tenth configuration example according to the present embodiment, when the second link is selected, the link which is on the path of the selected TDM transmission line, which has the number of TDM transmission lines exceeding the number of wavelengths available in the link, and which includes the number of TDM transmission lines exceeding the number of wavelengths available in the link excluding the first link by the largest excess number is selected as the second link. Thus, a result of the designing process may be obtained with the least possible portions in which a TDM transmission line of a larger capacity is used.

Although the TDM transmission line includes a large number of links having the number of TDM transmission lines exceeding the number of wavelengths available in the links by a large excessive number, a result of the designing process may be obtained more correctly and at a lower processing frequency with the least possible portions in which a TDM transmission line of a larger capacity is used.

FIG. 37 is a flowchart corresponding to an example of the eleventh configuration.

In FIG. 37, the same step as in FIG. 7 is assigned the same step number, and the explanation is omitted here.

The difference from FIG. 7 is that, in addition to the input illustrated in FIG. 7 during the input, the cost for each section of the TDM transmission line and for each capacity is input (step S170), and that a high cost TDM transmission line is excluded before generating an excess wavelength link list (step S171). FIGS. 38 and 39 are examples of the cost for each section and each capacity of a TDM transmission line. FIG. 38 illustrates, for example, the price of a transponder used for the TDM transmission line of the capacity of 32 when the price of the transponder used for the TDM transmission line of the capacity of 8 is 1. For example, in the case of the section of the TDM transmission line of the number 1, the transponder of the capacity of 32 is 4.1 times as high as the transponder of the capacity of 3. In the case of the section of the TDM transmission line of the number 6, a regenerator is required in the TDM transmission line of the capacity of 32, and it is assumed that the regenerator is equal to the transponder in price, that is, doubled to 8.2. In this example, the regenerator is exemplified. When equipment other than transponder is required, its cost may be included in the cost.

FIG. 39 is an example of the number of the necessary generation repeaters in the transmission as the cost. The number 1 in the capacity of 32 in the column of the number 6 indicates that one regenerator is required in the process.

Next, FIG. 40 is a flowchart of excluding a high-cost TDM transmission line. In FIG. 40, a TDM transmission line is selected for each section (step S175), and if the ratio of the cost of a larger capacity to the cost of a smaller capacity is obtained (step S176), and if it exceeds a threshold (step S177), then the TDM transmission lines in the section of the TDM transmission line are excluded from the candidate in later selecting a TDM transmission line (step S178). The process in step S179 is to determine whether or not all sections of the TDM transmission line have been selected, and to determine the repetition of the processes if all sections have not been selected.

When there are the TDM transmission lines of larger and smaller capacities, for example, when there are TDM transmission lines of capacities of 8 and 32, the capacity of 8 indicates a TDM transmission line of a smaller capacity, and the capacity of 32 indicates a TDM transmission line of a larger capacity. It is assumed that since a TDM transmission line of a smaller capacity is used in the first designing process, the number of TDM transmission lines exceeds the number of wavelengths available in the WDM system. Therefore, substantially the TDM transmission line of a smaller capacity is a TDM transmission line selected in the first designing process, and a TDM transmission line of a larger capacity refers to all TDM transmission lines having a capacity larger than the first selected TDM transmission line.

The threshold may be, for example, 4.1. In this case, the TDM transmission line exceeding the cost value of 4.1 to require a regenerator etc. is excluded. The method of excluding a TDM transmission line from a candidate when a TDM transmission line is selected is a method of deleting the information about a corresponding TDM transmission line from the TDM transmission line list. Otherwise, as illustrated in FIG. 41, a column of selectability is added to the TDM transmission line list to input "false" when a TDM transmission line is excluded, and "true" otherwise. Then, if the column stores "true" when a TDM transmission line is selected, and stores "false" when a TDM transmission line is not selected. As illustrated in FIG. 39, when the cost of the TDM transmission line of a smaller capacity is 0, no division is performed. Therefore, the value obtained by subtracting the cost of the smaller capacity from the cost of the larger capacity with the threshold, and a determination is made. The threshold in this case is, for example, 0, and when one or more regenerator of larger than 0 is required, no selection is made. The operations of other portions are the same as in the first configuration example.

In the eleventh configuration example according to the present embodiment, when network information is input, the cost information about each speed of the TDM transmission line is input for each section of the TDM transmission line. Then, if the ratio of the low speed transmission line cost to the high speed transmission line cost exceeds a specified value in the section of the same TDM transmission line, the TDM transmission lines in the section of the TDM transmission line are excluded before selecting the TDM transmission line. Thus, a TDM transmission line which incurs the soaring of the cost by selecting a high-speed transmission line may be prevented from being selected.

By preventing a TDM transmission line which incurs the soaring of the cost when selecting a higher speed transmission line when a redesigning process is performed from being selected, the cost does not unnecessarily soar.

In the eleventh configuration example, when a TDM transmission line is selected, for example, the TDM transmission line of the capacity of 8 may be transmitted as light from the start point to the end point, but the TDM transmission line of the capacity of 32 may require a regenerator between the start point and the end point. If such a TDM transmission line is selected, the cost soars when it is changed to the TDM transmission line of the capacity of 32. Then, in the eleventh configuration example, the process of deleting the TDM transmission line which incurs the soaring of the cost by using the TDM transmission line of a large capacity is added to the first configuration example.

Figure 42:
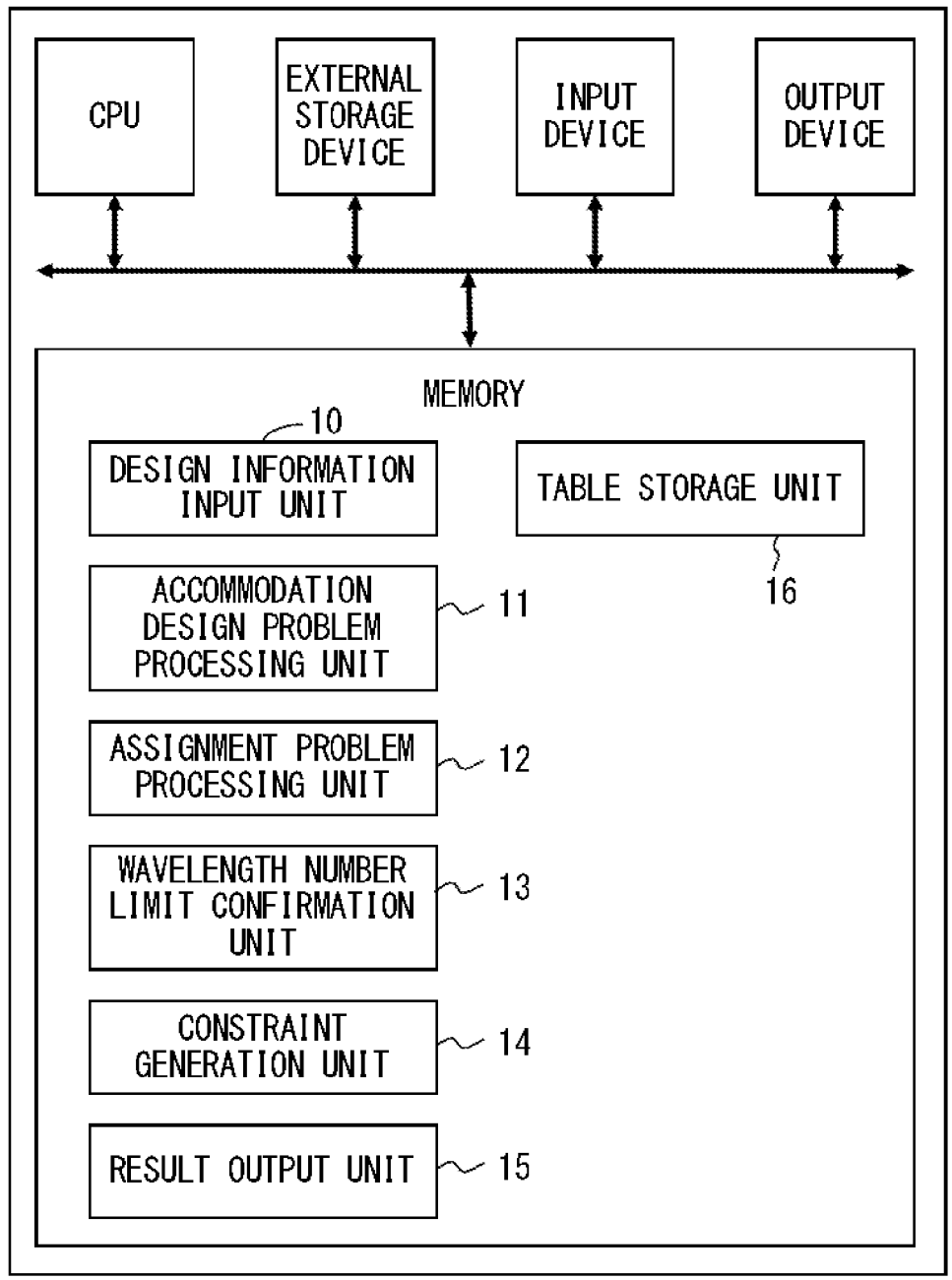
FIG. 42 is a block diagram of the function of the network design apparatus according to an embodiment of the present invention.

FIG. 42 is a block diagram of the function of the network design apparatus according to the present embodiment.

Each function is developed in the memory of a network design apparatus. In a design information input unit 10, the topology information, demand information, TDM transmission line information, etc. in FIG. 7 are received. An accommodation design problem processing unit 11 performs the process of solving a accommodation designing problem. An assignment problem processing unit 12 performs the process of assigning each demand to a TDM transmission line from a result of solving a accommodation designing problem. A wavelength number limit confirmation unit 13 confirms the limit of the number of wavelengths for each link. A constraint generation unit 14 generates a constraint on an accommodation designing problem and a assignment problem, and performs the processes in steps S24 through S31 in FIG. 7. A result output unit 15 outputs a result of design. A table storage unit 16 stores each table indicated by the explanation of each configuration example.

Figure 43:
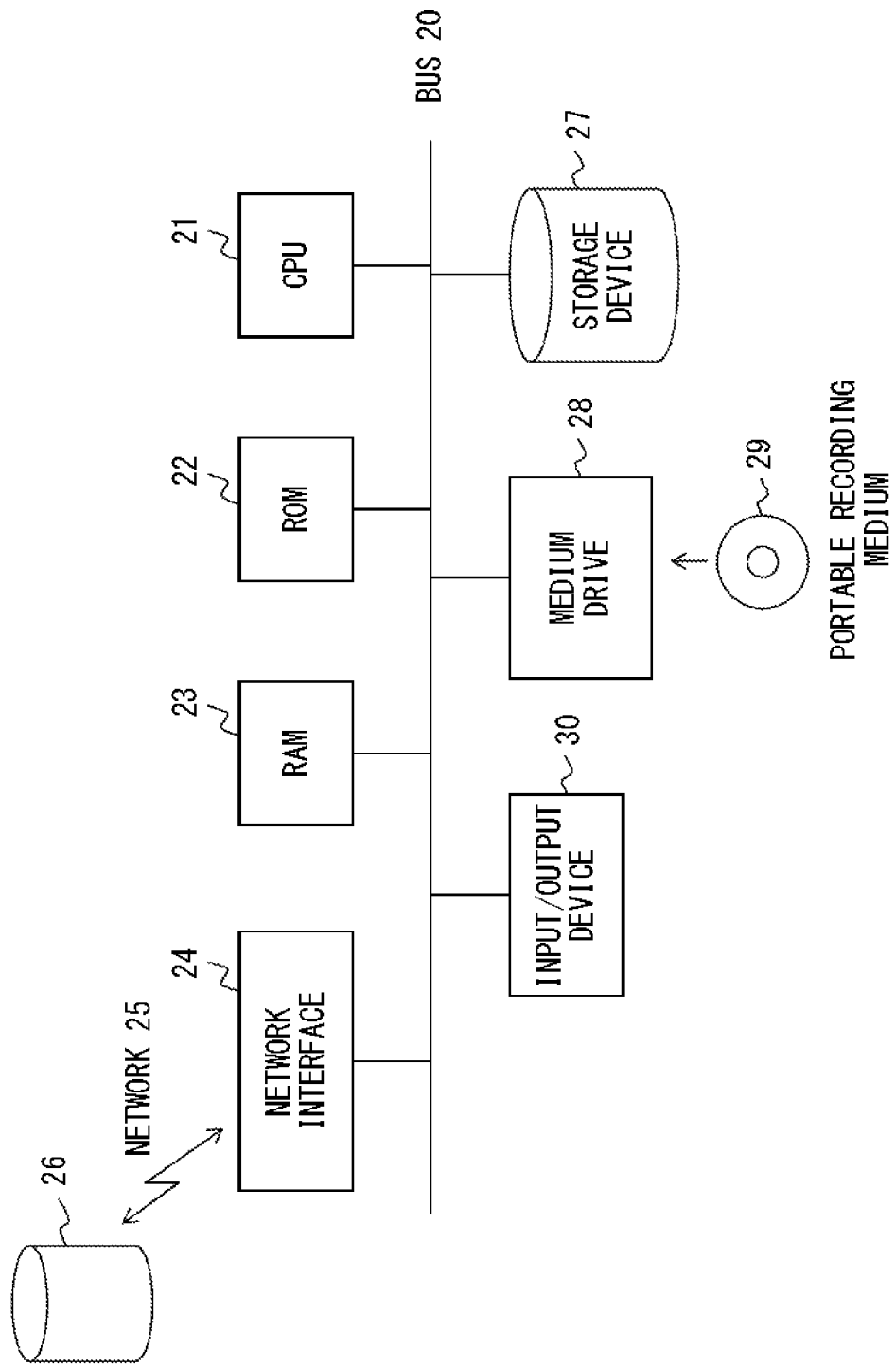
FIG. 43 is a view of a hardware environment of a computer for executing a program when the process according to an embodiment of the present invention is realized by a program.

FIG. 43 is a view of a hardware environment of a computer for executing a program when the process according to an embodiment of the present invention is realized by a program.

A CPU 21 is connected to ROM 22, RAM 23, a network interface 24, a storage device 27, a medium drive 28, and an input/output device 30 through a bus 20.

The ROM 22 stores a basic program such as BIOS etc. for allowing a computer to correctly function, and the CPU 21 executes the program to realize the basic function of the computer.

The storage device 27 stores a program for performing the processes according to the present embodiment using an external storage device such as a hard disk etc. The program stored in the storage device 27 is developed in the RAM 23, and is executed by the CPU 21.

The program for performing the processes of the present embodiment may be stored in a portable recording medium 29, and the CPU 21 may read the program from the portable recording medium 29 using the medium drive 28, and execute the program by developing the program in the RAM 23.

The portable recording medium 29 is a recording medium such as CD-ROM, a DVD, IC memory, Blu-ray, a flexible disk, etc.

The input/output device 30 may be a display, a printer, a keyboard, a mouse, etc., receives data from a user, and presents an output to a user.

The network interface 24 accesses a database 26 etc. of an information provider through a network 25. The program for performing the processes of the present embodiment may be stored in the database 26, downloaded from the database 26 into the storage device 27 and the portable recording medium 29, and executed. Furthermore, the program may be executed through the network 25 from the database 26 without downloading the program from the database 26.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. A network design apparatus in a network which accommodates a TDM (time divisional multiplexing) transmission line using a plurality of wavelengths in a wavelength division multiplexing technique, the network design apparatus comprising:
an accommodation design problem processing unit which receives at least information about a demand, an upper limit of a number of wavelengths available for each link, and TDM transmission line information, and obtains a number of necessary TDM transmission lines to accommodate all demands for each link so that the number of available wavelengths is not exceeded for each link;
an assignment problem processing unit which determines a demand to be accommodated in each TDM transmission line from the obtained number of TDM transmission lines and the demand to be accommodated; and
an iterative process unit which
repeats a process of setting a constraint for reducing a number of wavelengths available for each of a first link having the largest exceeding number of wavelengths and a second link farthest from the first link in links in which the number of TDM transmission lines exceeds the number of wavelengths available when a demand is accommodated in the process of the assignment problem processing unit, and
allows the accommodation design problem processing unit and the assignment problem processing unit to perform designing again under a changed constraint.

2. The device according to claim 1, wherein
the accommodation design problem processing unit is further provided with network topology information and a cost of a TDM transmission line for each section and speed of the TDM transmission line, and obtains the number of TDM transmission lines so that a total cost may be minimized.

3. The device according to claim 2, further comprising
a device configured to exclude, when a cost of a TDM transmission line for each speed is input for each section of the TDM transmission line and a TDM transmission line is selected, a corresponding TDM transmission line from options when a ratio of a low speed transmission line cost to a high speed transmission line cost exceeds a specified value.

4. The device according to claim 1, wherein
the iterative process unit comprises:
a device configured to generate a list of links exceeding the number of wavelengths;
a device configured to select a TDM transmission line which passes through a largest number of links included in the list;
a device configured to select a link having a largest number of excess wavelengths on the selected TDM transmission line as the first link;
a device configured to select a link exceeding a number of wavelengths on the selected TDM transmission line and having a longest distance from the first link as the second link;
a device configured to change a constraint of a number of wavelengths of the first link and the second link;
a device configured to delete a link included in the TDM transmission line from the list; and
a device configured to repeat the change of the constraint until the list becomes empty.

5. The device according to claim 4, further comprising instead of the device configured to select a link exceeding a number of wavelengths on the selected TDM transmission line and having a longest distance from the first link as the second link
a device configured to select a link exceeding a number of wavelengths on the selected TDM transmission line and having a distance from the first link by a largest hop count as the second link.

6. The device according to claim 4, further comprising instead of the device configured to select a TDM transmission line which passes through a largest number of links included in a list of a link exceeding a number of wavelengths
a device configured to select a TDM transmission line when there are two or more TDM transmission lines which passes through a largest number of links included in the list and have same start and end points.

7. The device according to claim 4, further comprising instead of the device configured to select a TDM transmission line which passes through a largest number of links included in a list of a link exceeding a number of wavelengths
a device configured to select a TDM transmission line which passes through a largest number of links included in the list and has a largest number of TDM transmission lines having same start and end points.

8. The device according to claim 4, further comprising instead of the device configured to select a TDM transmission line which passes through a largest number of links included in a list of a link exceeding a number of wavelengths
a device configured to select a TDM transmission line which passes through a largest number of links included in the list and has a largest total number of TDM transmission lines passing through a same link in links included in the list.

9. The device according to claim 4, further comprising instead of the device configured to select a TDM transmission line which passes through a largest number of links included in a list of a link exceeding a number of wavelengths
a device configured to select a TDM transmission line which passes through a largest number of links included in the list and has a largest total number of TDM transmission lines passing through a same link in links included in the list and having a same terminal point as one of terminal points of the same link.

10. The device according to claim 4, further comprising instead of the device configured to select a TDM transmission line which passes through a largest number of links included in a list of a link exceeding a number of wavelengths
a device configured to select a TDM transmission line which passes through a largest number of links included in the list and has a smallest number of links passed through in links deleted from the list.

11. The device according to claim 4, further comprising instead of the device configured to select a first link and the device configured to select a second link
a device configured to select a first link and a second link so that the first link and the second link are located on the selected TDM transmission line and a number of a pair of start and end points of a TDM transmission line which passes both the first and second links is minimized.

12. The device according to claim 4, further comprising instead of the device configured to select a first link and the device configured to select a second link
a device configured to select a first link and a second link so that the first link and the second link are located on the selected TDM transmission line and a number of TDM transmission lines which pass both the first and second links is minimized.

13. The device according to claim 4, further comprising instead of the device configured to select a link exceeding a number of wavelengths on the selected TDM transmission line and having a longest distance from the first link as the second link
a device configured to select a link having a largest number of excess wavelengths in links left after deleting a first link on the selected TDM transmission line as a second link.

14. A method conducted by a network design apparatus for designing a network in a network which accommodates a TDM (time divisional multiplexing) transmission line using a plurality of wavelengths in a wavelength division multiplexing technique, the method comprising:
  receiving, by an accommodation design problem processing unit of the network design apparatus, at least information about a demand, an upper limit of a number of wavelengths available for each link, and TDM transmission line information, and obtaining, by an accommodation design problem processing unit of the network design apparatus, a number of necessary TDM transmission lines to accommodate all demands for each link so that the number of available wavelengths is not exceeded for each link;
  determining, by an assignment problem processing unit of the network design apparatus, a demand to be accommodated in each TDM transmission line from the obtained number of TDM transmission lines and the demand to be accommodated; and
  repeating, by an iterative process unit of the network design apparatus, a process of setting a constraint for reducing a number of wavelengths available for each of a first link having the largest exceeding number of wavelengths and a second link farthest from the first link in links in which the number of TDM transmission lines exceeds the number of wavelengths available when a demand is accommodated in the process of the assignment problem processing step, and allowing, by an assignment problem processing unit of the network design apparatus, the accommodation design problem processing step and the assignment problem processing step to perform designing again under a changed constraint.

15. A non-transitory computer readable storage medium storing a program used to direct a computer to execute a process for designing a network in a network which accommodates a TDM (time divisional multiplexing) transmission line using a plurality of wavelengths in a wavelength division multiplexing technique, the process comprising:
  receiving at least information about a demand, an upper limit of a number of wavelengths available for each link, and TDM transmission line information, and obtaining a number of necessary TDM transmission lines to accommodate all demands for each link so that the number of available wavelengths is not exceeded for each link;
  determining a demand to be accommodated in each TDM transmission line from the obtained number of TDM transmission lines and the demand to be accommodated; and
  repeating a process of setting a constraint for reducing a number of wavelengths available for each of a first link having the largest exceeding number of wavelengths and a second link farthest from the first link in links in which the number of TDM transmission lines exceeds the number of wavelengths available when a demand is accommodated in the process of the assignment problem processing step, and allowing the accommodation design problem processing step and the assignment problem processing step to perform designing again under a changed constraint.

* * * * *